US012530239B2

(12) United States Patent
Chawla et al.

(10) Patent No.: US 12,530,239 B2
(45) Date of Patent: Jan. 20, 2026

(54) SHARED MEMORY FABRIC WORKLOAD PERFORMANCE SYSTEM

(71) Applicant: Dell Products L.P., Round Rock, TX (US)

(72) Inventors: Gaurav Chawla, Austin, TX (US); John Cardente, Milford, MA (US); William Price Dawkins, Lakeway, TX (US); Stuart Allen Berke, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 18/152,245

(22) Filed: Jan. 10, 2023

(65) Prior Publication Data

US 2024/0231937 A1     Jul. 11, 2024

(51) Int. Cl.
*G06F 9/46* (2006.01)
*G06F 9/50* (2006.01)

(52) U.S. Cl.
CPC ............ *G06F 9/505* (2013.01); *G06F 9/5016* (2013.01); *G06F 2209/502* (2013.01)

(58) Field of Classification Search
CPC ... G06F 9/505; G06F 9/5016; G06F 2209/502
See application file for complete search history.

(56) References Cited

U.S. PATENT DOCUMENTS

| 9,535,763 B1* | 1/2017 | Cook ..................... G06F 9/50 |
| 9,860,340 B2 | 1/2018 | Shen et al. |
| 10,970,113 B1* | 4/2021 | Kurtzer ................ G06F 9/5005 |
| 2016/0085587 A1* | 3/2016 | Dube .................... G06F 9/4881 |
| | | 718/104 |
| 2020/0142735 A1 | 5/2020 | Maciocco et al. |
| 2024/0119301 A1* | 4/2024 | Jeon ...................... G06N 3/0455 |
| 2024/0256333 A1* | 8/2024 | Weber .................. G06F 9/5044 |

* cited by examiner

*Primary Examiner* — Diem K Cao
(74) *Attorney, Agent, or Firm* — Joseph Mencher

(57) ABSTRACT

A shared memory fabric workload performance system includes a resource orchestrator device coupled to processing systems and memory systems that are configured to provide a shared memory fabric to each of the processing systems. The resource orchestrator device receives a request to perform a workload, identifies functions for performing the workload, and generates a DAG that identifies a respective processing resource type and a respective memory requirement for performing each of the functions. For each of the functions, the resource orchestrator device determines a respective processing resource provided by the processing systems that includes the processing resource type identified in the DAG for performing that function, and a respective memory resource provided by the memory systems that is accessible to that respective processing resource, and maps that respective memory resource to that respective processing resource based on the memory requirement identified in the DAG for performing that function.

20 Claims, 26 Drawing Sheets

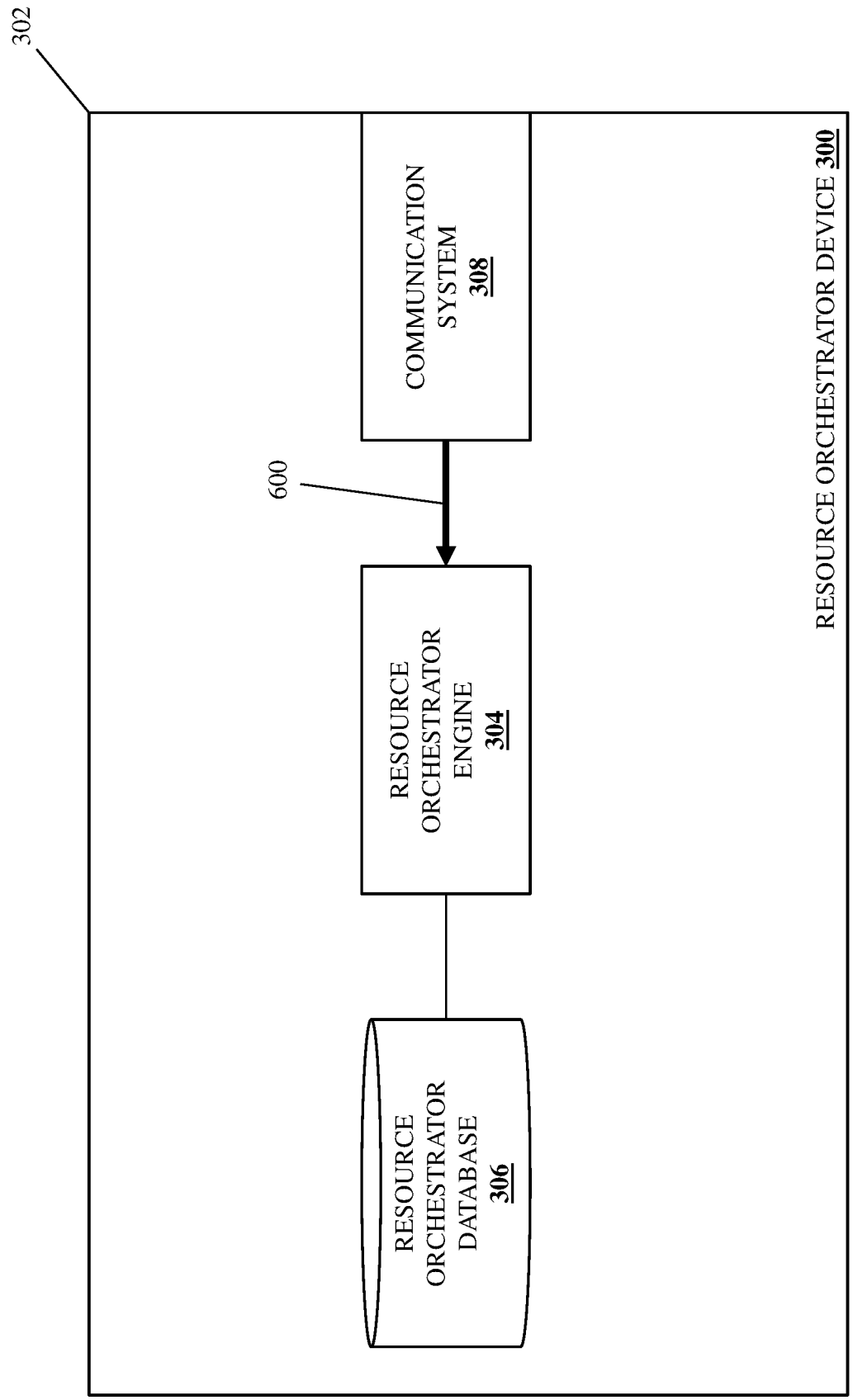

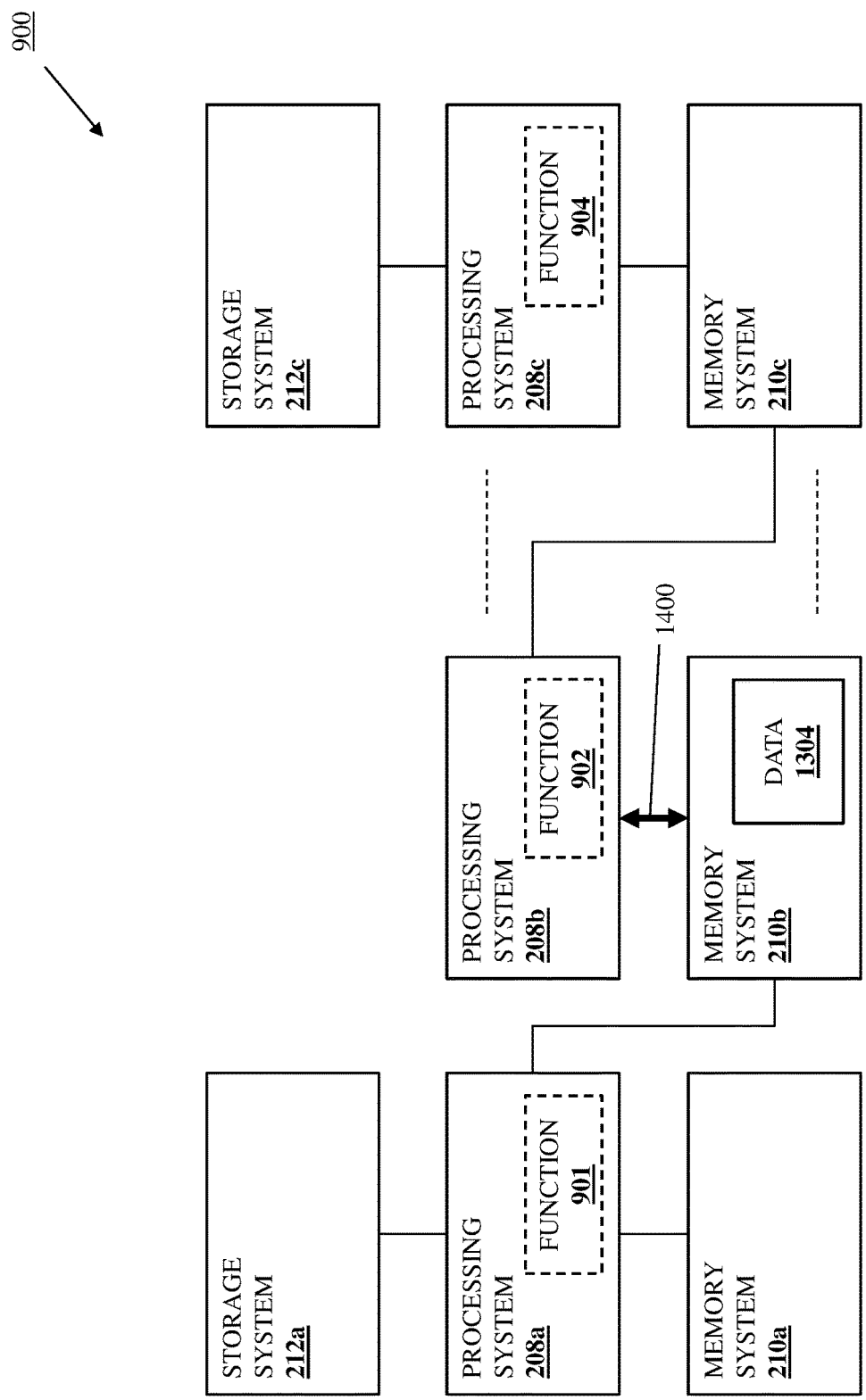

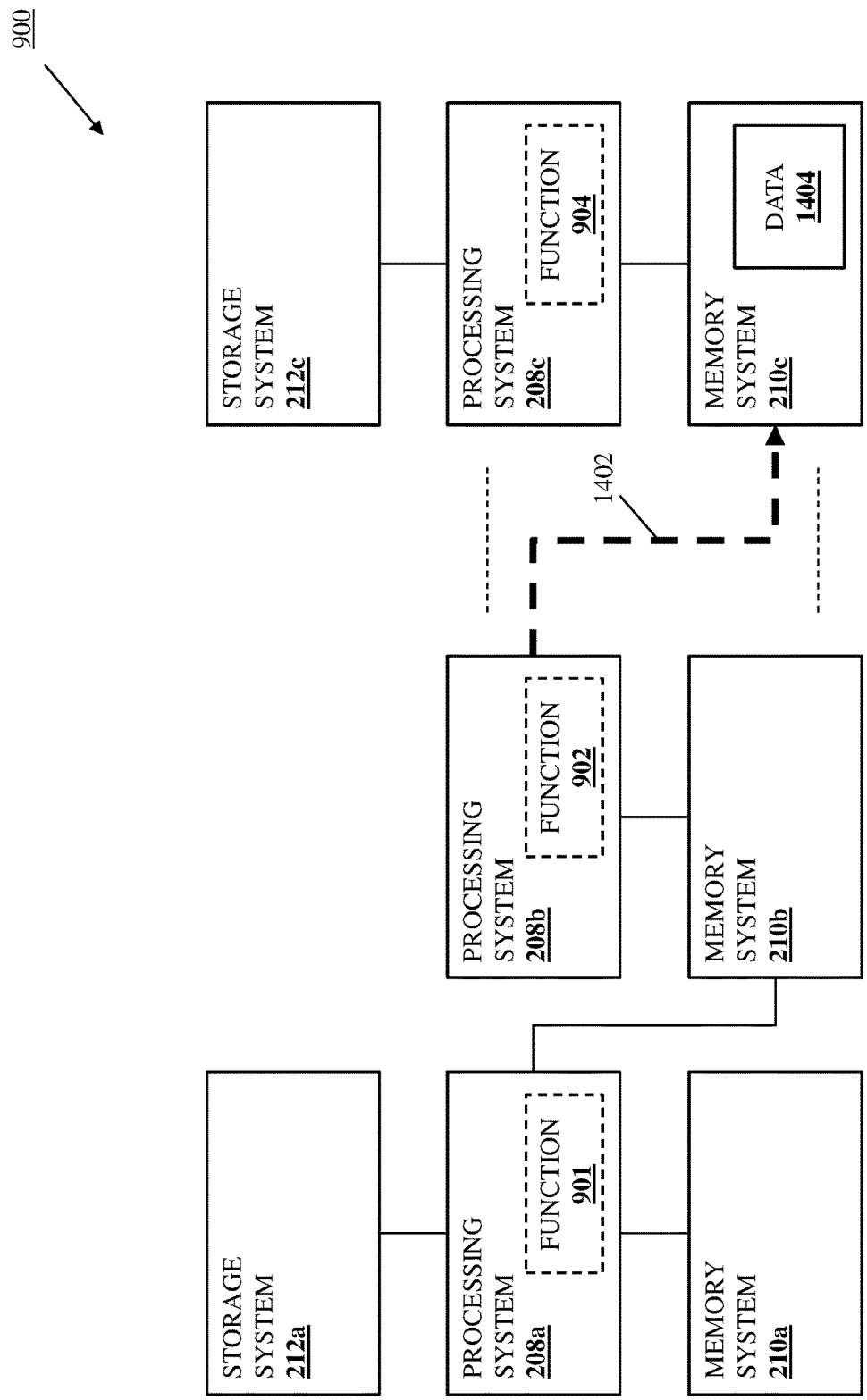

SHARED MEMORY FABRIC WORKLOAD PERFORMANCE SYSTEM

BACKGROUND

The present disclosure relates generally to information handling systems, and more particularly to performing a workload via a plurality of information handling systems using a shared memory fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes provided in workload performance systems and used to perform workloads. For example, a workload may require a plurality of workload operations to be performed, and respective server devices may us their processing/memory resources to perform each of those workload operations in order to perform that workload. For example, when a conventional workload performance system is used to perform workload operations of a workload in a sequence that allows the workload to be performed, a first processing resource in a first server device will retrieve first data required to perform its workload operation from a storage system, provide that first data in a first memory resource in the first server device, perform its workload operation on that first data to generate second data, and transmit that second data for storage in the storage system. A second processing resource in a second server device will then retrieve the second data from the storage system, provide that second data in a second memory resource in the second server device, perform its workload operation on that second data, and transmit that second data for storage in the storage system, and this process will be repeated until all of the workload operations required to perform the workload have been performed. As will be appreciated by one of skill in the art in possession of the present disclosure, such conventional workload performance operations result in an inefficient use of the processing resources, memory resources, storage resources, and/or networking resources in the conventional workload performance system.

Accordingly, it would be desirable to provide a workload performance system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource orchestrator engine that is configured to: receive a request to perform a workload; identify a plurality of functions for performing the workload; generate a Directed Acyclic Graph (DAG) for performing the plurality of functions that identifies a respective processing resource type and a respective memory requirement for performing each of the plurality of functions; determine, for each of the plurality of functions, a respective processing resource that is provided by a plurality of processing systems and that includes the processing resource type identified in the DAG for performing that function, and a respective memory resource that is provided by a plurality of memory systems that are configured to provide a shared memory fabric to each of the plurality of processing systems; map, for each of the plurality of functions and based on the memory requirement identified in the DAG for performing that function, the respective memory resource determined for that function to the respective processing resource determined for that function; and transmit, to a first processing resource determined for a first function in the plurality of functions, a first function instruction that is configured to cause the first processing resource to perform the first function on first data in a first memory resource determined for the first function to generate second data, and store that second data in a second memory resource determined for a second function in the plurality of functions.

BRIEF DESCRIPTION OF THE DRAWINGS

FIG. 6B is a schematic view illustrating an embodiment of the resource orchestrator device of FIG. 3 operating during the method of FIGS. 4A and 4B.

FIG. 14A is a schematic view illustrating an embodiment of the operation of the resource pipeline of FIG. 9 during the method of FIGS. 4A and 4B.

FIG. 14B is a schematic view illustrating an embodiment of the operation of the resource pipeline of FIG. 9 during the method of FIGS. 4A and 4B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
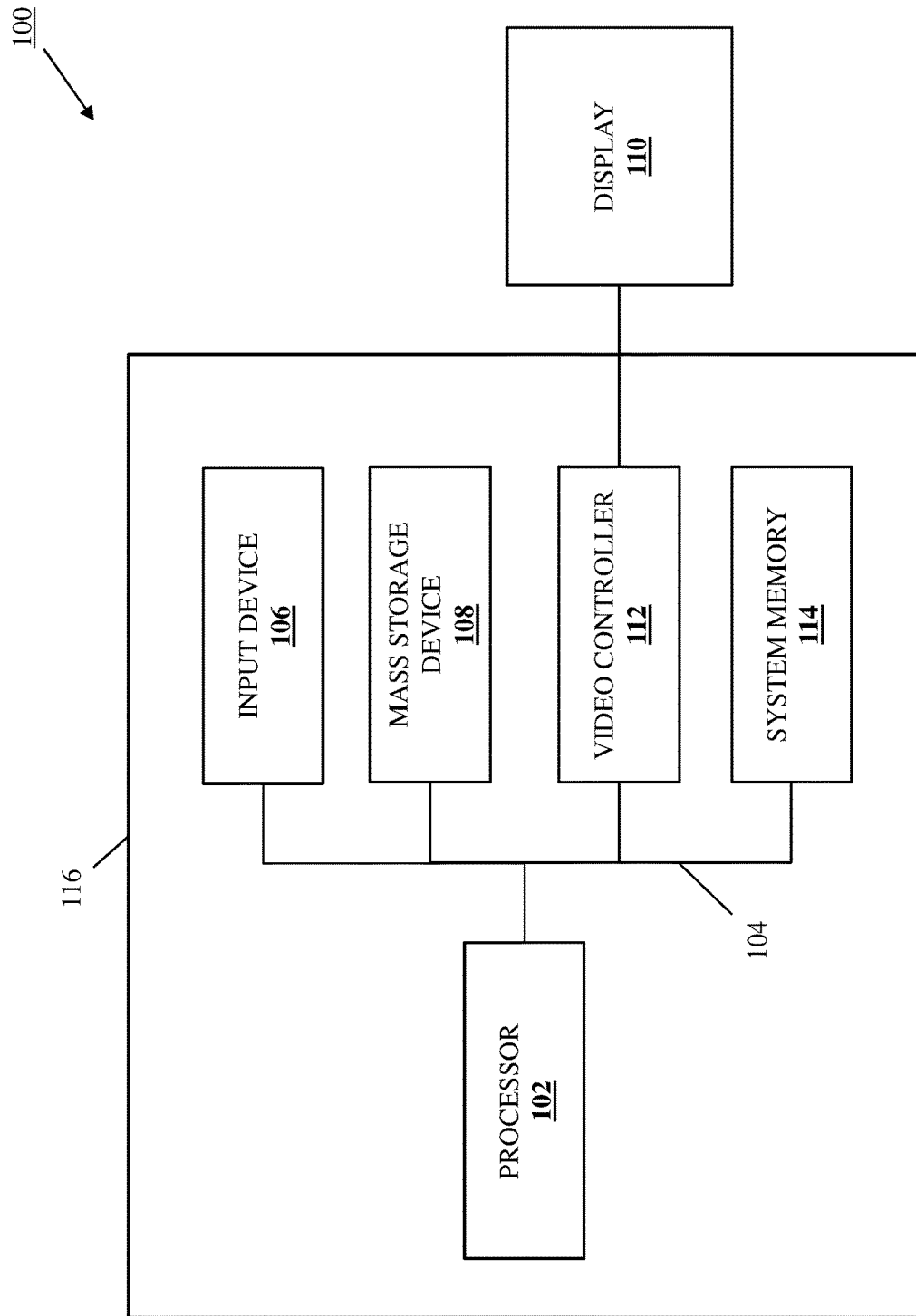
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
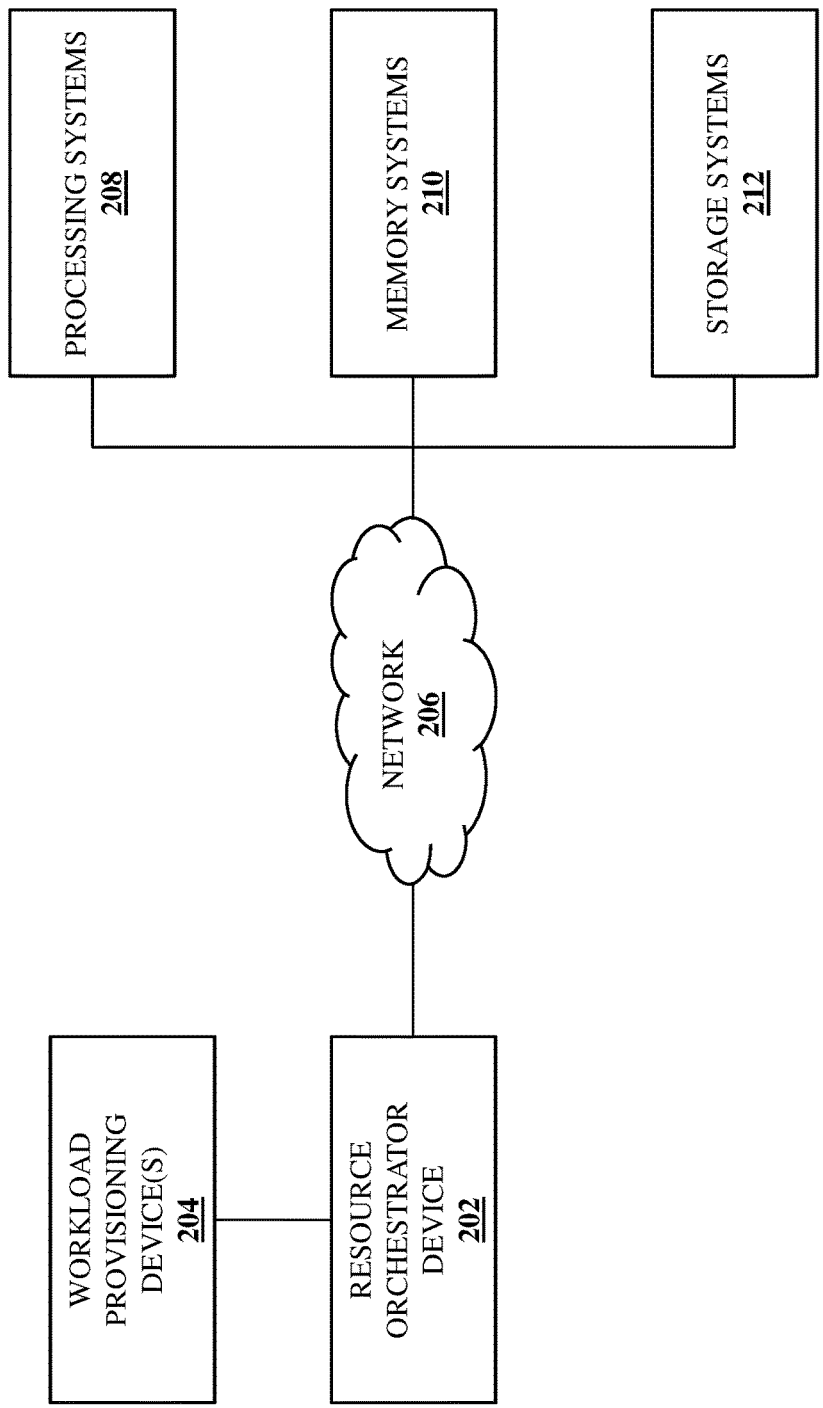
FIG. 2 is a schematic view illustrating an embodiment of a shared memory fabric workload performance system.

Referring now to FIG. 2, an embodiment of a shared memory fabric workload performance system 200 is illustrated that may be provided according to the teachings of the present disclosure. In the illustrated embodiment, the shared memory fabric workload performance system 200 includes a resource orchestrator device 202 that may operate to perform the resource orchestrator functionality described below. In an embodiment, the resource orchestrator device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data resource orchestrator devices provided in the shared memory fabric workload performance system 200 may include any devices that may be configured to operate similarly as the resource orchestrator device 202 discussed below.

In the illustrated embodiment, the shared memory fabric workload performance system 200 includes one or more workload provisioning devices 204 that are coupled to the resource orchestrator device 202, and while the workload provisioning device(s) 204 are illustrated as being directly coupled to the resource orchestrator device 202, one of skill in the art in possession of the present disclosure will appreciate how the workload provisioning device(s) 204 may be coupled to the resource orchestrator device 202 via a network (e.g., a Local Area Network (LAN), the Internet, combinations thereof, and/or other networks known in the art) while remaining within the scope of the present disclosure as well. In an embodiment, the workload provisioning device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to request the performance of the workloads discussed below. However, while illustrated and discussed as being provided by particular computing devices, one of skill in the art in possession of the present disclosure will recognize that workload provisioning devices provided in the shared memory fabric workload performance system 200 may include any devices that may be configured to operate similarly as the workload provisioning device(s) 204 discussed below.

In the illustrated embodiment, the resource orchestrator device 202 is coupled to a network 206 that in the examples below includes a processing fabric, a memory fabric, and storage fabric, and that may be provided using a LAN, the Internet, combinations thereof, and/or any of a variety of networks that one of skill in the art in possession of the present disclosure will recognize as allowing the functionality described below. As such, the resource orchestrator device 202 is coupled via the network 206 to a processing fabric that, in the examples illustrated and discussed below, is provided by a plurality of processing systems 208 that may be included in server devices or other computing systems known in the art. As described below, the processing systems 208 that provide the processing fabric may be provided by different types of processing systems that may include Central Processing Unit (CPU) processing systems, Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems, other hardware accelerator processing systems, and/or other types of processing systems that would be apparent to one of skill in the art in possession of the present disclosure would appreciate may be utilized to perform workloads.

The resource orchestrator device 202 is also coupled via the network 206 to a memory fabric that, in the examples illustrated and discussed below, is provided by a plurality of memory systems 210 that may be included in server devices or other computing systems known in the art. As described below, the memory systems 210 that provide the memory fabric may be provided by different types of memory systems that may include CPU-accessible memory systems, GPU-accessible memory systems, FPGA-accessible memory systems, DPU-accessible memory systems, NIC-accessible memory systems or other packet-processor-accessible memory systems, ASIC-accessible memory systems, computational memory systems, other hardware-accelerator-accessible memory systems, and/or other types of memory systems that would be apparent to one of skill in the art in possession of the present disclosure would appreciate may be utilized by processing systems to perform workloads. As discussed below, the memory systems 210 may be configured to provide a shared memory fabric for the processing systems 208 such that each memory system 210 appears as a "local" memory system to each of the processing systems 208, with memory system access enabled via Remote Direct Memory Access (RDMA) operations and/or other memory system access techniques that would be apparent to one of skill in the art in possession of the present disclosure.

In an embodiment, any of the memory systems 210 may be "proximate" to any of the processing systems 208 based on, for example, the processing of data stored in that memory system by its proximate processing system being relatively more efficient than the processing of that data stored in that memory system by the other processing systems due to, for example, that proximity resulting in relatively faster access to that data that in turn allows relatively faster processing of that data and/or faster transfers of that data over a network (e.g., with a time needed to access data measured in terms of the time required to receive the first byte of data, the last byte of data, and/or using other data access time measurement techniques that one of skill in the art in possession of the present disclosure would recognize as taking into account data access delays cause by the number of network segments traversed, network bandwidth, network physical media, network protocols, network contention, network reliability, and/or other data access delays known in the art), and/or based on any other memory system/processing system proximity factors that would be apparent to one of skill in the art in possession of the present disclosure.

In a specific example, "proximity" between a memory system and a processing system may be defined in terms of network latency that may be measured based on "hops", network fabric type, and/or using other latency metrics that would be apparent to one of skill in the art in possession of the present disclosure. For example, the number of hops in a topology between a memory system and a processing system may be limited to a threshold number of hops in order to be "proximate". In another example, "proximity" may be defined by the enablement of relatively higher performance networking between a memory system and a processing system, with the memory system or other "data landing zone" transformed in some embodiments into a memory space to enable memory-to-memory data transfers for peer-to-peer communications (while eliminating an external network).

The resource orchestrator device 202 is also coupled via the network 206 to a storage fabric that, in the examples illustrated and discussed below, is provided by a plurality of storage systems 212. As described below, the storage systems 212 that provide the storage fabric may be provided by different types of storage systems that may include CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing systems to perform workloads. However, while a specific shared memory fabric workload performance system 200 has been illustrated and described, one of skill in the art in possession of the present disclosure will appreciate how the shared memory fabric workload performance system of the present disclosure may include a variety of components and/or component configurations while remaining within the scope of the present disclosure as well.

Figure 3:
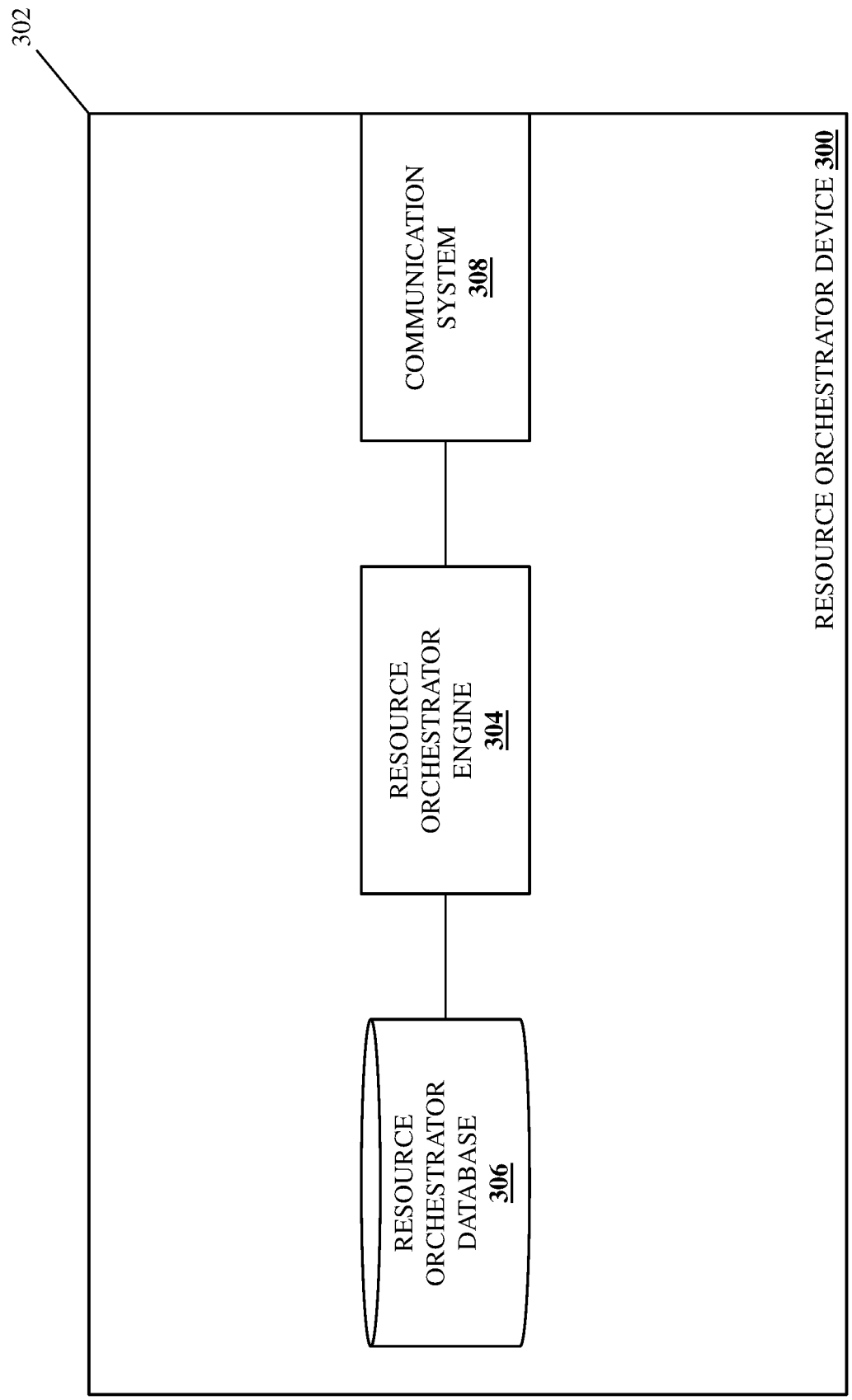
FIG. 3 is a schematic view illustrating an embodiment of a resource orchestrator device that may be included in the shared memory fabric workload performance system of FIG. 2.

Referring now to FIG. 3, an embodiment of a resource orchestrator device 300 is illustrated that may provide the resource orchestrator device 202 discussed above with reference to FIG. 2. As such, the resource orchestrator device 300 may be provided by the IHS 100 discussed above with reference to FIG. 1 and/or may include some or all of the components of the IHS 100, and in specific examples may be provided by a service device. Furthermore, while illustrated and discussed as being provided by a server device, one of skill in the art in possession of the present disclosure will recognize that the functionality of the resource orchestrator device 300 discussed below may be provided by other devices that are configured to operate similarly as the resource orchestrator device 202 discussed below. In the illustrated embodiment, the resource orchestrator device 300 includes a chassis 302 that houses the components of the resource orchestrator device 300, only some of which are illustrated and discussed below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a resource orchestrator engine 304 that is configured to perform the functionality of the resource orchestrator engines and/or resource orchestrator devices discussed below. As discussed below, the resource orchestrator engine may include a plurality of sub-engines such as the data processing workflow sub-engine, dataflow orchestrator sub-engine, the resource reservation sub-engine, and the resource monitoring sub-engine discussed below, although one of skill in the art in possession of the present disclosure will appreciate how the functionality of the resource orchestrator engine may be provided in a variety of manners that will fall within the scope of the present disclosure as well.

The chassis 302 may also house a storage system (not illustrated, but which may include the storage 108 discussed above with reference to FIG. 1) that is coupled to the resource orchestrator engine 304 (e.g., via a coupling between the storage system and the processing system) and that includes a resource orchestrator database 306 that is configured to store any of the information utilized by the resource orchestrator engine 304 discussed below. The chassis 302 may also house a communication system 308 that is coupled to the resource orchestrator engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific resource orchestrator device 300 has been illustrated and described, one of skill in the art in possession of the present disclosure will recognize that resource orchestrator devices (or other devices operating according to the teachings of the present disclosure in a manner similar to that described below for the resource orchestrator device 300) may include a variety of components and/or component configurations for providing conventional functionality, as well as the functionality discussed below, while remaining within the scope of the present disclosure as well.

Figure 4A:
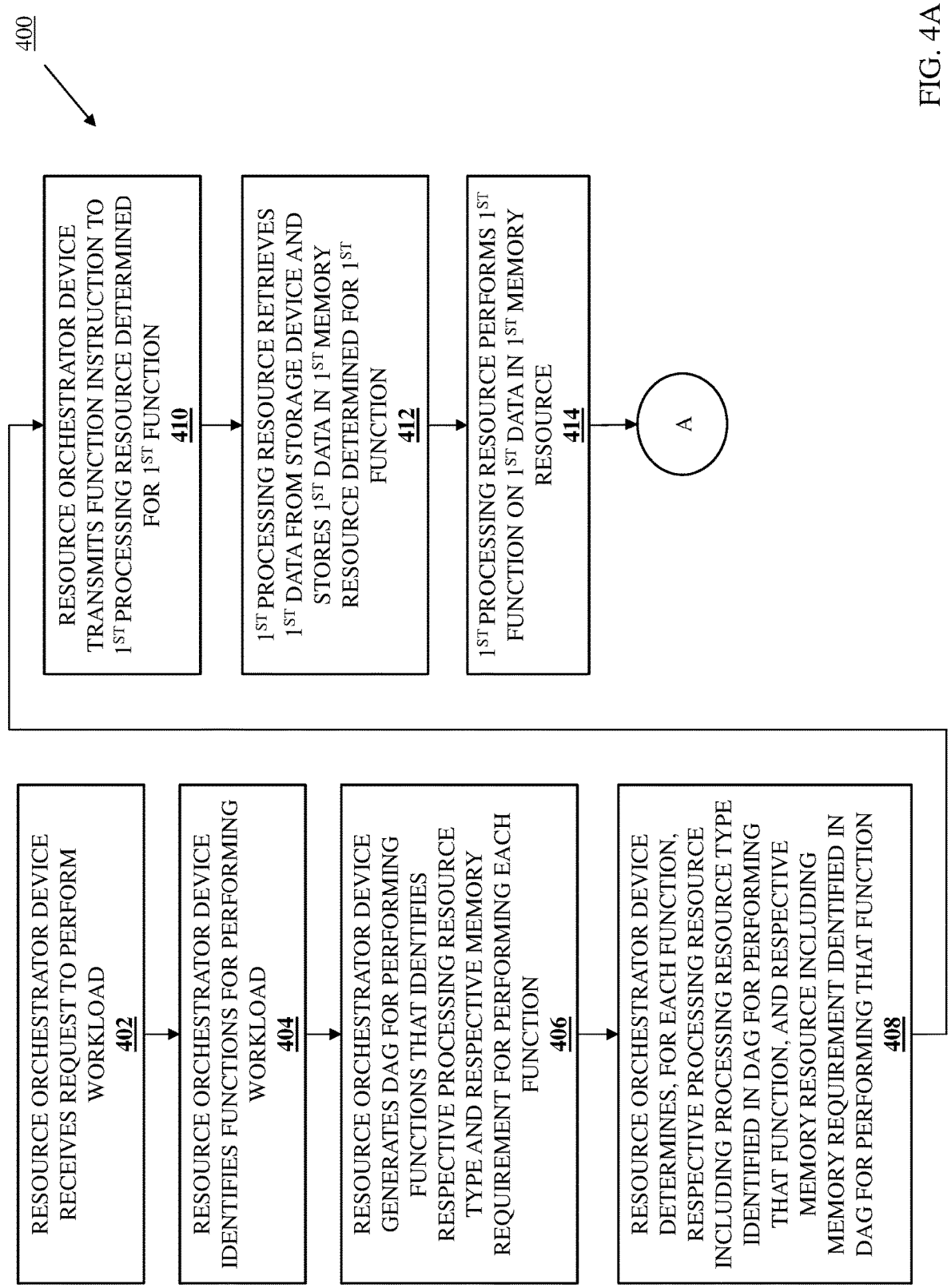
FIG. 4A is a flow chart illustrating an embodiment of a portion of a method for performing workloads using a shared memory fabric.
Figure 4B:
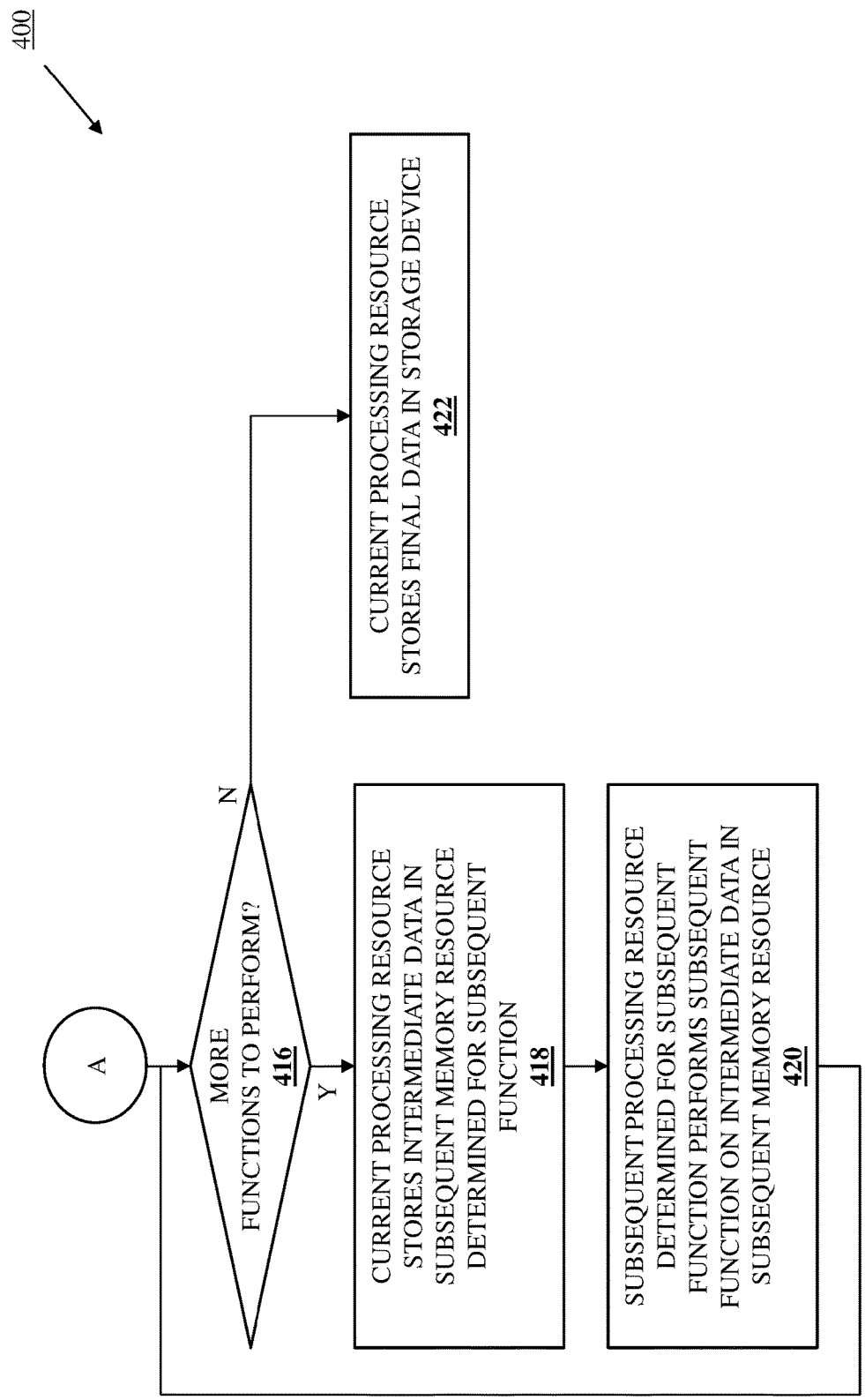
FIG. 4B is a flow chart illustrating an embodiment of a portion of a method for performing workloads using a shared memory fabric.

Referring now to FIGS. 4A and 4B, an embodiment of a method 400 for performing workloads using a shared memory fabric is illustrated. As discussed below, the systems and methods of the present disclosure provide for the performance of workloads using a plurality of processing resources that are each configured to perform a function that provides a workload operation required to perform that workload, while causing any "current" processing resource to output intermediate data generated via its performance of a "current" function to a "subsequent" memory resource used by a "subsequent" processing resource to perform a "subsequent" function.

For example, the shared memory fabric workload performance system of the present disclosure may include a resource orchestrator device coupled to processing systems and memory systems that are configured to provide a shared memory fabric to each of the processing systems. The resource orchestrator device receives a request to perform a workload, identifies functions for performing the workload, and generates a DAG that identifies a respective processing resource type and a respective memory requirement for performing each of the functions. For each of the functions, the resource orchestrator device determines a respective processing resource provided by the processing systems that includes the processing resource type identified in the DAG for performing that function, and a respective memory resource provided by the memory systems that is accessible to that respective processing resource, and maps that respective memory resource to that respective processing resource based on the memory requirement identified in the DAG for performing that function. The resource orchestrator device may then transmit a first function instruction to a first processing resource determined for a first function in the plurality of functions, with the first function instruction causing the first processing resource to perform the first function on first data in a first memory resource determined for the first function to generate second data, and store that second data in a second memory resource determined for a second function in the plurality of functions.

As such, the shared memory fabric workload performance system of the present disclosure provides for the more efficient use of the processing resources, memory resources, storage resources, and/or networking resources in the shared memory fabric workload performance system at least in part by defining each workload as a group of functions in a DAG that is then mapped to a distributed tiered processing/memory fabric based on knowledge of the processing/memory resource relationships, with the DAG also used to configure processing resources to output intermediate data to memory resources used by other processing resources in order to eliminate inefficient data transfers performed in conventional workload performance systems.

Figure 5:
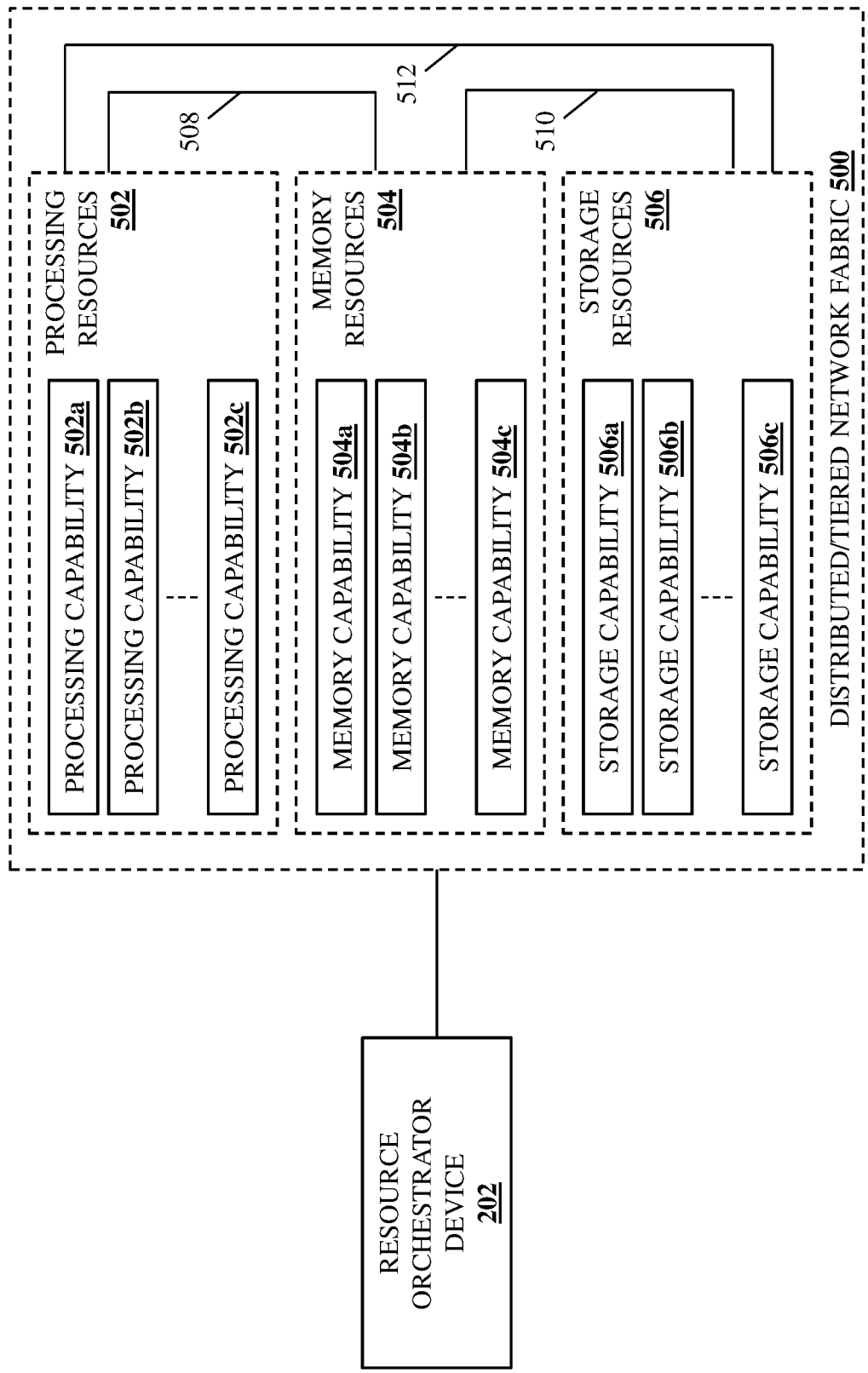
FIG. 5 is a schematic view illustrating an embodiment of a distributed/tiered network fabric that may be provided during the method of FIGS. 4A and 4B.

With reference to FIG. 5, during and/or prior to the method 400, the resource orchestrator device 202/300 may generate a distributed/tiered network fabric 500 that is based on the processing systems 208 that provide the processing fabric, the memory systems 210 that provide the memory fabric, and the storage systems 212 that provide the storage fabric, discussed above with reference to FIG. 2. In an embodiment, the resource orchestrator engine 304 in the resource orchestrator device 202/300 may use processing, memory, and storage Application Programming Interfaces (APIs) to discover each node (e.g., each server device, other computing device, storage system, etc.) that is coupled to the network 206 and that includes the processing systems 208, memory systems 210, and storage systems 212.

Furthermore, the resource orchestrator engine 304 may then determine a plurality of processing resources 502 available from the processing systems 208, a plurality of memory resources 504 available from the memory systems 210, and a plurality of storage resources 506 available from the storage systems 212, and identify them in the distributed/tiered network fabric 500, as illustrated in FIG. 5. As discussed above, the processing resources 502 may include CPU processing systems, GPU processing systems, FPGA processing systems, DPU processing systems, NIC processing systems or other packet processors, ASIC processing systems, other hardware accelerator processing systems, and/or other types of processing systems that would be apparent to one of skill in the art in possession of the present disclosure would appreciate may be utilized to perform workloads.

Similarly, the memory resources 504 may include CPU-accessible memory systems, GPU-accessible memory systems, FPGA-accessible memory systems, DPU-accessible memory systems, NIC-accessible memory systems or other packet-processor-accessible memory systems, ASIC-accessible memory systems, other hardware-accelerator-accessible memory systems, and/or other types of memory systems that would be apparent to one of skill in the art in possession of the present disclosure would appreciate may be utilized by processing resources to perform workloads. Similarly, the storage resources 506 may include CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing resources to perform workloads.

The resource orchestrator engine 304 in the resource orchestrator device 202/300 may also determine a plurality of processing capabilities 502a, 502b, and up to 502c available from the processing resources 502, and identify them in the distributed/tiered network fabric 500. As discussed below, each processing resource 502 may be configured to perform one or more functions such as, for example, function(s) included in microservice(s) that those processing resources are configured to perform, and/or other functions that would be apparent to one of skill in the art in possession of the present disclosure. As such, the processing capabilities 502a-502c may include the identification of functions that each processing resource 502 is configured to perform, but one of skill in the art in possession of the present disclosure will appreciate how the processing capabilities 502a-502c may identify processing bandwidth, processing speed, and/or any other processing capabilities of processing resources known in the art.

The resource orchestrator engine 304 in the resource orchestrator device 202/300 may also determine a plurality of memory capabilities 504a, 504b, and up to 504c available from the memory resources 504, and identify them in the distributed/tiered network fabric 500. As discussed below, the memory capabilities 504a-504c may be identified by memory tiers in which each memory resource 504 is included (e.g., a relatively high performance memory tier, at least one intermediate memory tier, and a relatively low performance memory tier), but one of skill in the art in possession of the present disclosure will appreciate how the memory capabilities 504a-504c may identify memory bandwidth, memory speed, and/or any other memory capabilities of memory resources known in the art.

The resource orchestrator engine 304 in the resource orchestrator device 202/300 may also determine a plurality of storage capabilities 506a, 506b, and up to 506c available from the storage resources 506, and identify them in the distributed/tiered network fabric 500. As discussed below, the storage capabilities 506a-506c may be identified by storage tiers in which each storage resource 506 is included (e.g., a relatively high performance storage tier, at least one intermediate storage tier, and a relatively low performance storage tier), but one of skill in the art in possession of the present disclosure will appreciate how the storage capabilities 506a-506c may identify storage bandwidth, storage speed, and/or any other storage capabilities of storage resources known in the art.

The resource orchestrator engine 304 in the resource orchestrator device 202/300 may also determine the processing/memory couplings 508 between the processing resources 502 and memory resources 504, the memory/storage couplings 510 between the processing memory resources 504 and the storage resources 506, and the processing/storage couplings 512 between the processing resources 502 and storage resources 506, and identify them in the distributed/tiered network fabric 500. As such, the distributed/tiered network fabric 500 may identify how each of the processing resources 502, memory resources 504, and storage resources 506 are connected and/or coupled together, including information about the proximity of the processing resources 502 and each of the memory resources 504 and storage resources 506 (e.g., by indicating the memory resources 504 that are directly connected to processing resources 502 as opposed to memory resources 504 that are coupled to processing resources 502 by one or more components and/or a network, indicating the memory resources 504 that are coupled to processing resources 502 by relatively high speed networking components, etc.).

In a specific example, the memory resources 504 in the distributed/tiered network fabric 500 may be configured as a shared memory fabric that allows each of the memory resources 504 to be accessible by each of the processing resources 502 via Remote Direct Memory Access (RDMA) operations or other remote access techniques known in the art, and thus each memory resource 504 may appear as a "local" memory resource (e.g., a directly-connected memory resource) to that processing resource regardless of the physical proximity of that memory resource to that processing resource. As such, while each processing resource 502 may be configured to access data in any of the memory resources 504 via RDMA operations in a manner similar to accessing data in local/directly connected memory resources, the processing/memory couplings 508 identified in the distributed/tiered network fabric 500 allow for the determination of "proximate" processing/memory resources and/or otherwise relatively efficient processing resource/memory resource combinations. However, while a specific resource abstraction provided by the distributed/tiered network fabric 500 has been illustrated and described, one of skill in the art in possession of the present disclosure will appreciate how the processing resources, memory resources, and storage resources available in a processing fabric, memory fabric, and storage fabric, respectively, may be abstracted in other manners that will fall within the scope of the present disclosure as well.

Figure 6A:
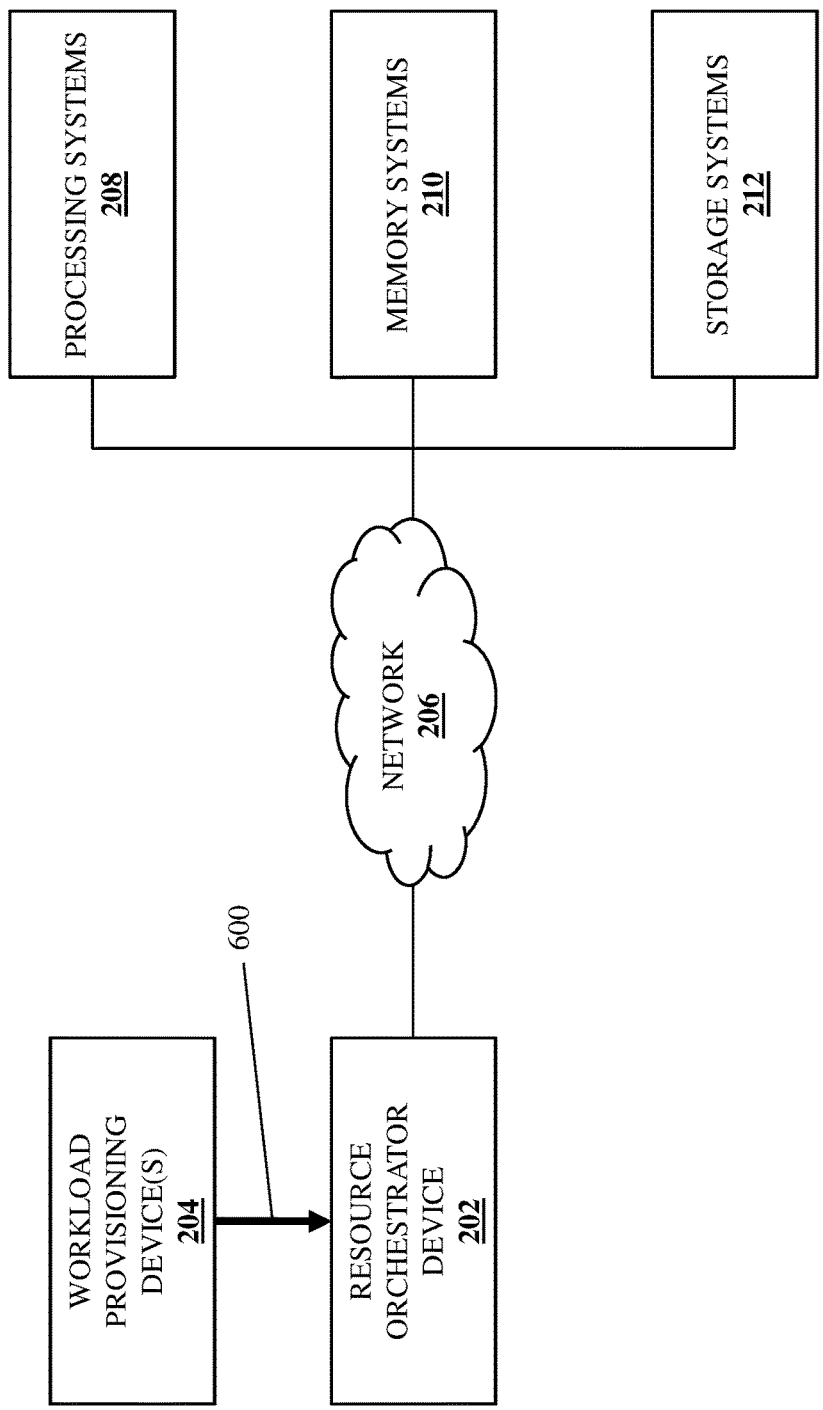
FIG. 6A is a schematic view illustrating an embodiment of the shared memory fabric workload performance system of FIG. 2 operating during the method of FIGS. 4A and 4B.

The method 400 begins at block 402 where a resource orchestrator device receives a request to perform a workload. With reference to FIGS. 6A and 6B, in an embodiment of block 402, the workload provisioning device(s) 204 may perform workload performance request transmission operations 600 that may include transmitting a request to perform a workload to the resource orchestrator device 202/300 such that the resource orchestrator engine 304 receives that request via its communication system 308. As discussed above, the workload whose performance is requested at block 402 may require the performance of a plurality of workload operations. In some examples, each of the workload operations required to perform a workload may be identified in the request to perform the workload. In other examples, the resource orchestrator engine 304 may be configured to identify each of the workload operations required to perform a workload in response to receiving the request to perform the workload. However, while a few specific examples have been provided, one of skill in the art in possession of the present disclosure will appreciate how workload operations for performing a workload may be identified in a variety of manners that will fall within the scope of the present disclosure as well.

Figure 7:
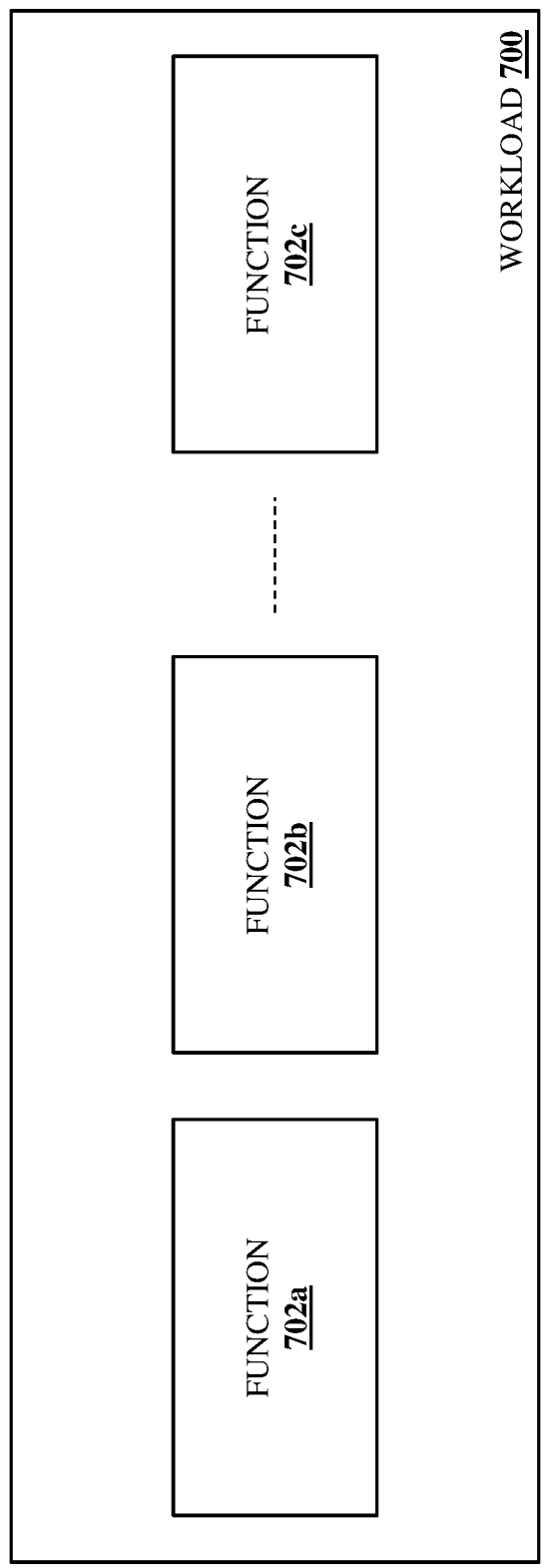
FIG. 7 is a schematic view illustrating an embodiment of a workload that may be performed during the method of FIGS. 4A and 4B.

The method 400 then proceeds to block 404 where the resource orchestrator device identifies functions for performing the workload. With reference to FIG. 7, in an embodiment of block 404, the resource orchestrator engine 304 in the resource orchestrator device 202/300 may identify a plurality of functions 702a, 702b, and up to 702c for a workload 700 whose performance was requested at block 402. For example, as discussed above, the processing capabilities 502a-502c of the processing resources 502 in the distributed/tiered network fabric 500 may identify functions that each processing resource 502 is configured to perform, and thus at block 404 the resource orchestrator engine 304 may determine, or each of the workload operations required to perform the workload 700, a respective function that provides for the performance of that workload operation. As will be appreciated by one of skill in the art in possession of the present disclosure, multiple processing resources 502 may be configured to perform any of the functions 702a-702c determined at block 404, and thus the function identification for the workload 700 operates to define the workload as a plurality of functions for performing its workload operations, each of which may be performed by one or more of the processing resources 502 in the distributed/tiered network fabric 500.

Figure 8:
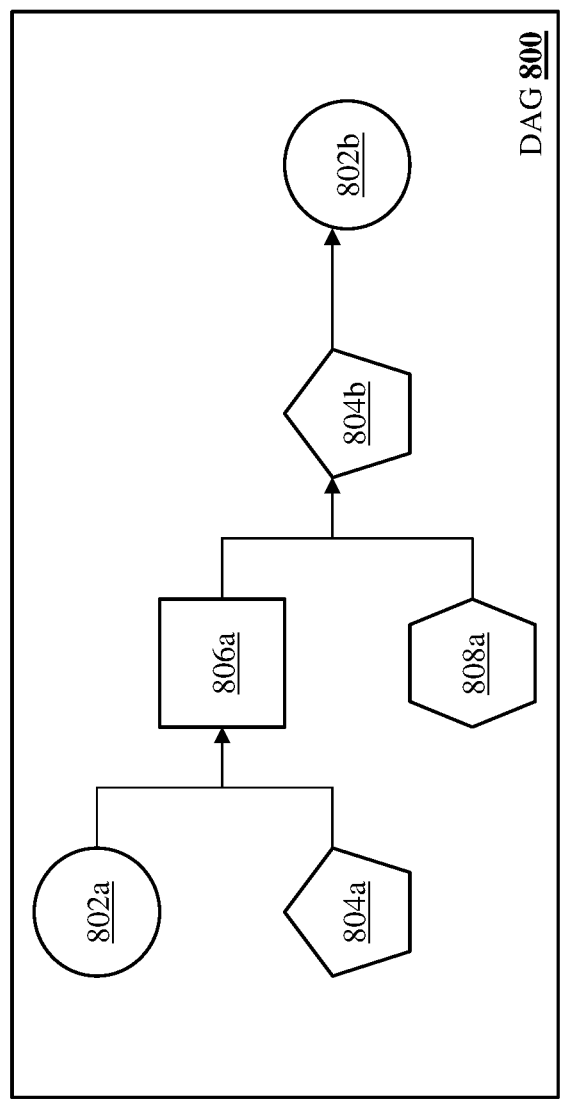
FIG. 8 is a schematic view illustrating an embodiment of Directed Acyclic Graph (DAG) that may be generated during the method of FIGS. 4A and 4B.

The method 400 then proceeds to block 406 where the resource orchestrator device generates a DAG for performing the functions that identifies a respective processing resource type and respective memory requirement for performing each function. With reference to FIG. 8, in an embodiment of block 406, a data processing workflow sub-engine in the resource orchestrator engine 304 of the resource orchestrator device 202/300 may generate a Directed Acyclic Graph (DAG) 800 that defines a data processing workflow for performing the workload requested at block 402. As discussed below, the DAG 800 includes a plurality of DAG operations that may define the functions and function sequencing required to perform the workload requested at block 402, with each DAG operation identifying a processing resource type that should be used to perform its function, function(s) that will provide inputs to its function and/or receive outputs from its function, and memory requirements for those inputs and/or outputs.

For example, as illustrated in FIG. 8, the DAG 800 includes a DAG operation 802a that defines a function to be performed by a first processing resource type (e.g., a GPU processing resource), and a DAG operation 804a that defines a function to be performed by a second processing resource type (e.g., an FPGA resource). The DAG operations 802a and 804a provide DAG operation results to a DAG operation 806a that is included in the DAG 800 and that defines a function to be performed by a third processing resource type (e.g., a DPU processing resource). The DAG 800 also includes a DAG operation 808a that defines a function to be performed by a fourth processing resource type (e.g., an ASIC processing resource), and the DAG operations 806a and 808a provide DAG operation results to a DAG operation 804b that is included in the DAG 800 and that defines a function to be performed by the second processing resource type (e.g., an FPGA processing resource). The DAG operation 804b provides a DAG operation result to a DAG operation 802b that is included in the DAG 800 and that defines a function to be performed by the first processing resource type (e.g., a GPU processing resource).

As described herein and as will be appreciated by one of skill in the art in possession of the present disclosure, the DAG 800 may define data inputs and/or outputs for each of the functions defined by its DAG operations. For example, the DAG 800 may define the inputs to the functions defined by the DAG operations 802a and 804a as data stored in one or more of the storage resources 506, and the output of the functions defined by the DAG operations 802a and 804a as the function defined by the DAG operation 806a, as well as the memory requirements (e.g., memory space, processor/memory performance requirements, etc.) for the memory resource used to store that output. The DAG 800 may also define the input to the function defined by the DAG operation 808a as data stored in one or more of the storage resources 506, and the output of the functions defined by the DAG operations 806a and 808a as the function defined by the DAG operation 804b, as well as the memory requirements (e.g., memory space, processor/memory performance requirements, etc.) for the memory resource used to store that output. The DAG 800 may also define the output of the function defined by the DAG operation 804b as the function defined by the DAG operation 802b, as well as the memory requirements (e.g., memory space, processor/memory performance requirements, etc.) for the memory resource used to store that output. The DAG 800 may also define the output of the function defined by the DAG operation 802b as one or more of the storage resources 506.

As such, the generation of the DAG at block 406 breaks the workload 700 into functions 702-702c, and then sequences those functions as DAG operations that define a processing resource type that should perform each of those functions, as well as the inputs to each of those functions, the outputs of each of those functions, and the memory requirements for the memory resources used to store those inputs/outputs. However, while a specific DAG has been described, one of skill in the art in possession of the present disclosure will appreciate how DAGs or other function performance structures may be utilized to define how workload operations should be performed in order to perform a workload while remaining within the scope of the present disclosure as well.

The method 400 then proceeds to block 408 where the resource orchestrator device determines, for each function, a respective processing resource including the processing resource type identified in the DAG for performing that function, and a respective memory resource including the memory requirement identified in the DAG for performing that function. In an embodiment, at block 408, the data processing workflow sub-engine in the resource orchestrator engine 304 of the resource orchestrator device 202/300 may provide the DAG generated at block 406 to a dataflow orchestrator sub-engine in the resource orchestrator engine 304 of the resource orchestrator device 202/300, which one of skill in the art in possession of the present disclosure will appreciate may be provided by a control plane service for the shared memory fabric workload performance system 200. The dataflow orchestrator sub-engine in the resource orchestrator engine 304 may then determine the processing resources 502, memory resources 504, and in some cases storage resources 506, that will be used to perform each function defined by a DAG operation in the DAG.

In a specific example, the dataflow orchestrator sub-engine in the resource orchestrator engine 304 of the resource orchestrator device 202/300 may operate at block 408 to identify, for each function defined by a DAG operation in the DAG, each processing resource that is configured to perform that function, as well as a proximate memory resource utilized by each of those processing resources. Furthermore, a resource monitoring sub-engine in the resource orchestrator engine 304 of the resource orchestrator device 202/300 may then determine a current utilization of each of those processing resources. Based on the current utilizations of the identified processing resources for each function, the proximate memory resource utilized by each of those processing resources, the relative proximities of processing resources to each other's memory resources, the relative proximity of storage resource(s) and processing resources that are configured to perform the first function(s) defined by the first DAG operation(s) using data stored in those storage resource(s), the relative proximity of storage resource(s) and processing resources that are configured to perform the last function(s) defined by the last DAG operation(s) and store the resulting data in those storage resource (s), and/or other factors that would be apparent to one of skill in the art in possession of the present disclosure, the dataflow orchestrator sub-engine in the resource orchestrator engine 304 may generate resource pipeline for performing the workload requested at block 402.

The dataflow orchestrator sub-engine in the resource orchestrator engine 304 of the resource orchestrator device 202/300 may then map, for each function defined by a DAG operation in the DAG, the respective memory resource determined for that function to the respective processing resource determined for that function (e.g., by mapping a memory region provided by that memory resource to memory address space used by that processing resource). As discussed below, a first processing resource that performs a first function defined by a first DAG operation in the DAG may be mapped to a memory resource that is configured to receive the output of that first function and provide it as an input to a second function defined by a second DAG operation in the DAG. Furthermore, intermediate processing resources that perform intermediate functions defined by intermediate DAG operations in the DAG may be mapped to memory resources that are configured to receive the output of a previous function defined by a previous DAG operation in the DAG and provide it as an input to a current function defined by a current DAG operation in the DAG. Further still, a last processing resource that performs a last function defined by a last DAG operation in the DAG may be mapped to a memory resource that is configured to receive the output of a last intermediate function defined by last intermediate DAG operation in the DAG and provide it as an input to the last function.

Figure 9:
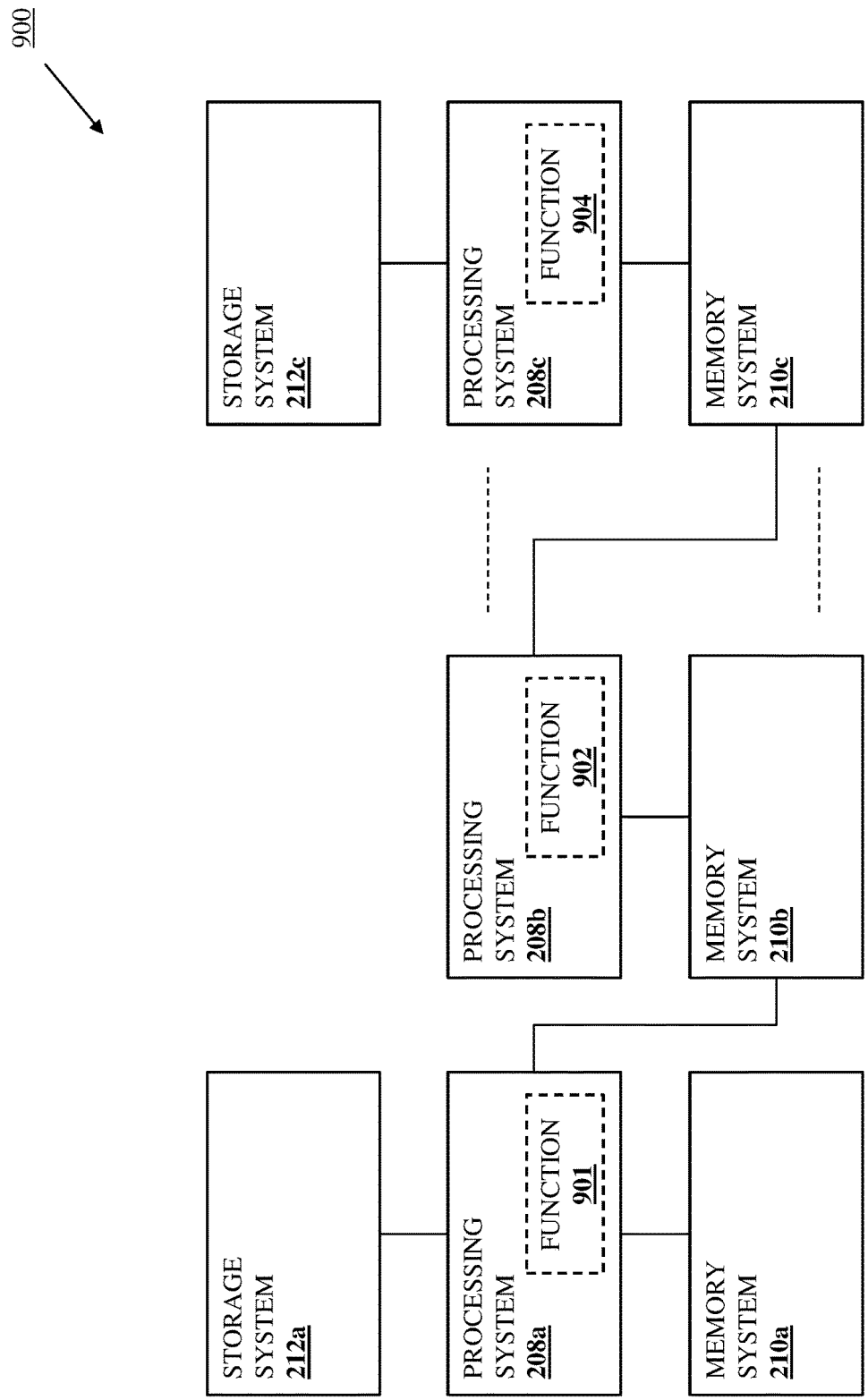
FIG. 9 is a schematic view illustrating an embodiment of a resource pipeline that may be generated during the method of FIGS. 4A and 4B.

With reference to FIG. 9, an embodiment of a resource pipeline for performing the workload requested at block 402 is illustrated. In this embodiment, the dataflow orchestrator sub-engine in the resource orchestrator engine 304 of the resource orchestrator device 202/300 has identified, for a function 901 defined by a DAG operation in the DAG, a processing system 208a that includes a processing resource that is configured to perform the function 901 and that includes the processing resource type defined by that DAG operation for performing the function 901, as well as a memory system 210a that includes a memory resource having the memory requirements for storing the input to the function 901. In addition, the dataflow orchestrator sub-engine in the resource orchestrator engine 304 has identified a storage system 212a having a source resource that provides a source location for retrieving the input to the function 901 (which will be stored in the memory system 210a).

As illustrated, the dataflow orchestrator sub-engine in the resource orchestrator engine 304 of the resource orchestrator device 202/300 has also identified, for a function 902 defined by a DAG operation in the DAG, a processing system 208b that includes a processing resource that is configured to perform the function 902 and that includes the processing resource type defined by that DAG operation for performing the function 902, as well as a memory system 210b that includes a memory resource having the memory requirements for storing the output of the function 901 and the input to the function 902. The dataflow orchestrator sub-engine in the resource orchestrator engine 304 of the resource orchestrator device 202/300 has also identified, for a function 904 defined by a DAG operation in the DAG, a processing system 208c that includes a processing resource that is configured to perform the function 904 and that includes the processing resource type defined by that DAG operation for performing the function 904, as well as a memory system 210c that includes a memory resource having the memory requirements for storing the output of a previous function and the input to the function 904. In addition, the dataflow orchestrator sub-engine in the resource orchestrator engine 304 has identified a storage system 212c having a source resource that provides a source location for retrieving the output of the function 904.

As such, one of skill in the art in possession of the present disclosure will appreciate how the resource pipeline 900 generated at block 408 may provide optimized performance of the workload requested at block 402 by, for example, identifying the processing system 208a (including the processing resource that is configured to perform the function 901) that is relatively close to the storage system 212a storing the source data for the workload and the memory system 210b of the processing system 208a (including the processing resource that is configured to perform the function 902), identifying the processing system 208b (including the processing resource that is configured to perform the function 902) that is relatively close to the memory system 210c of the processing system 208c (including the processing resource that is configured to perform the function 904), and identifying the processing system 208c (including the processing resource that is configured to perform the function 904) that is relatively close to the storage system 212a that will store the destination data for the workload. However, while a specific resource pipeline has been illustrated and described, one of skill in the art in possession of the present disclosure will appreciate how resource pipelines will vary based on the configuration and constraints of the processing fabric, memory fabric, and storage fabric while remaining within the scope of the present disclosure.

A resource reservation sub-engine in the resource orchestrator engine 304 of the resource orchestrator device 202/300 may then reserve the processing resources, memory resources, and storage resources included in the resource pipeline 900 for the performance of the functions that provide the workload requested at block 402, and the dataflow orchestrator sub-engine in the resource orchestrator engine 304 of the resource orchestrator device 202/300 may schedule the performance of the workload using the resource pipeline 900 via the configuration of any of the processing resources, memory resources, and storage resources included in the resource pipeline 900 in a manner that one of skill in the art in possession of the present disclosure would recognize as allowing for the functionality discussed below.

Figure 10:
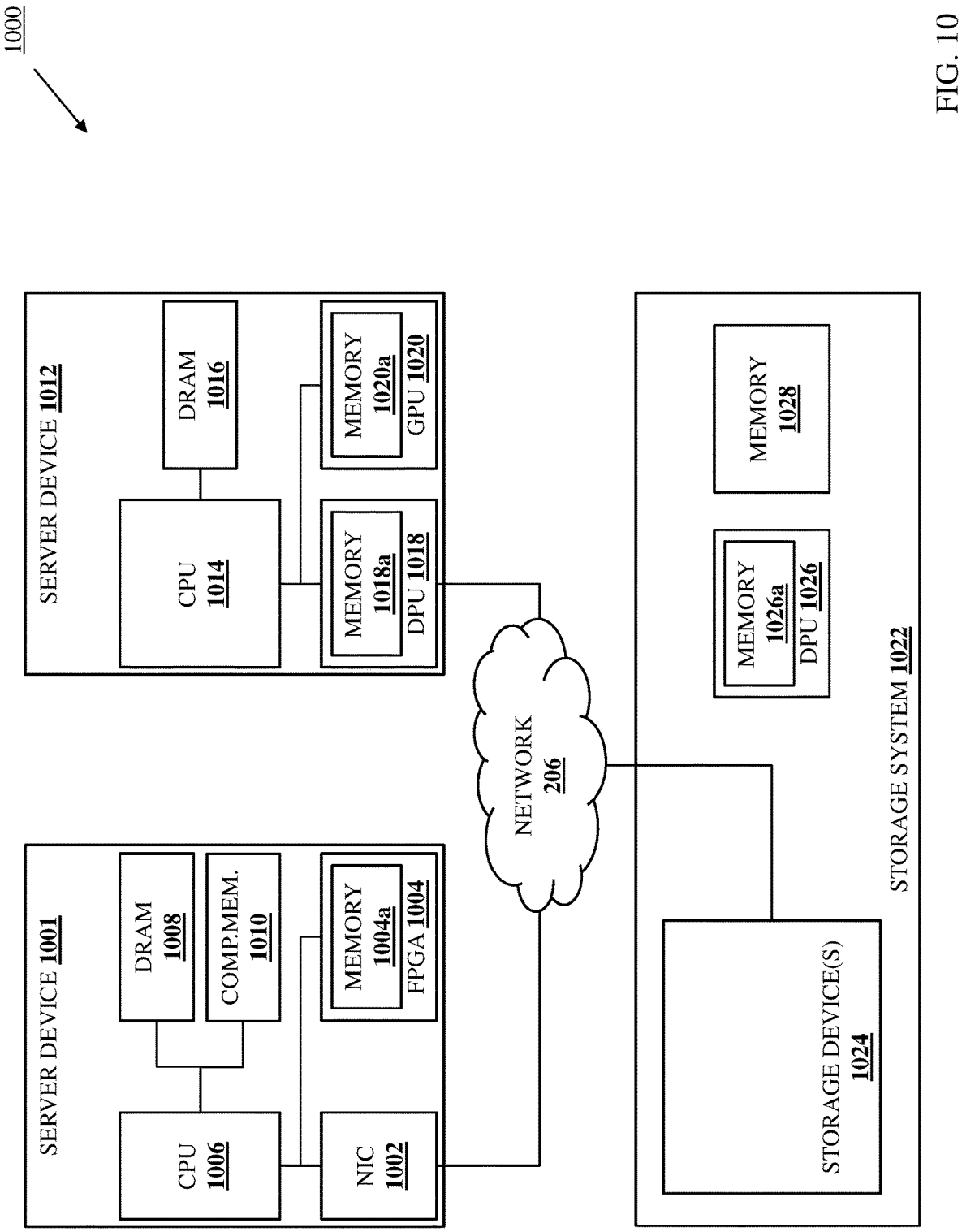
FIG. 10 is a schematic view illustrating an embodiment of networked system that may provide the resource pipeline of FIG. 9.

With reference to FIG. 10, an embodiment of a networked system 1000 is illustrated that may provide the resource pipeline 900 discussed above with reference to FIG. 9. In the illustrated embodiment, the networked system 1000 includes a server device 1001 having a NIC 1002 that is coupled to an FPGA 1004 that includes a memory system 1004a, and a CPU 1006 that is coupled to a DRAM memory system 1008 and a computational memory system 1010. The NIC 1002 in the server device 1001 is coupled via the network 206 discussed above with reference to FIG. 2 to a server device 1012 having a CPU 1014 that is coupled to a DRAM memory system 1016, a DPU 1018 that includes a memory system 1018a (and that couples the server device 1012 to the network 206), and a GPU 1020 that includes a memory system 1020a. A storage system 1022 includes one or more storage devices 1024 that are coupled to the network 206, and as illustrated may include a DPU 1026 having a memory system 1026a, and a memory system 1028. As will be appreciated by one of skill in the art in possession of the present disclosure, the networked system 1000 provides a simplified example of physical devices that may provide the processing fabric, memory fabric, and storage fabric discussed above.

Figure 11A:
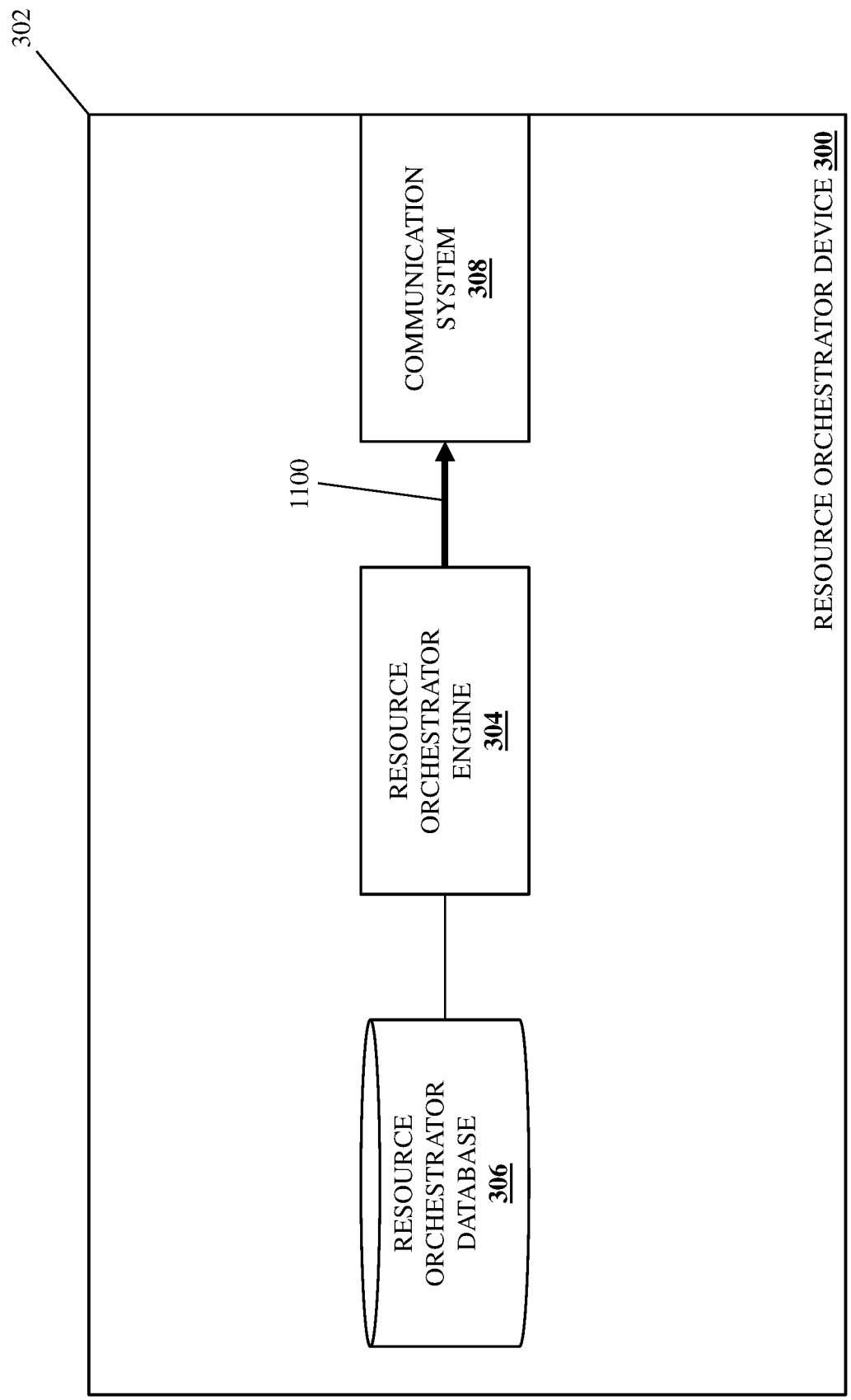
FIG. 11A is a schematic view illustrating an embodiment of the resource orchestration device of FIG. 3 operating during the method of FIGS. 4A and 4B.
Figure 11B:
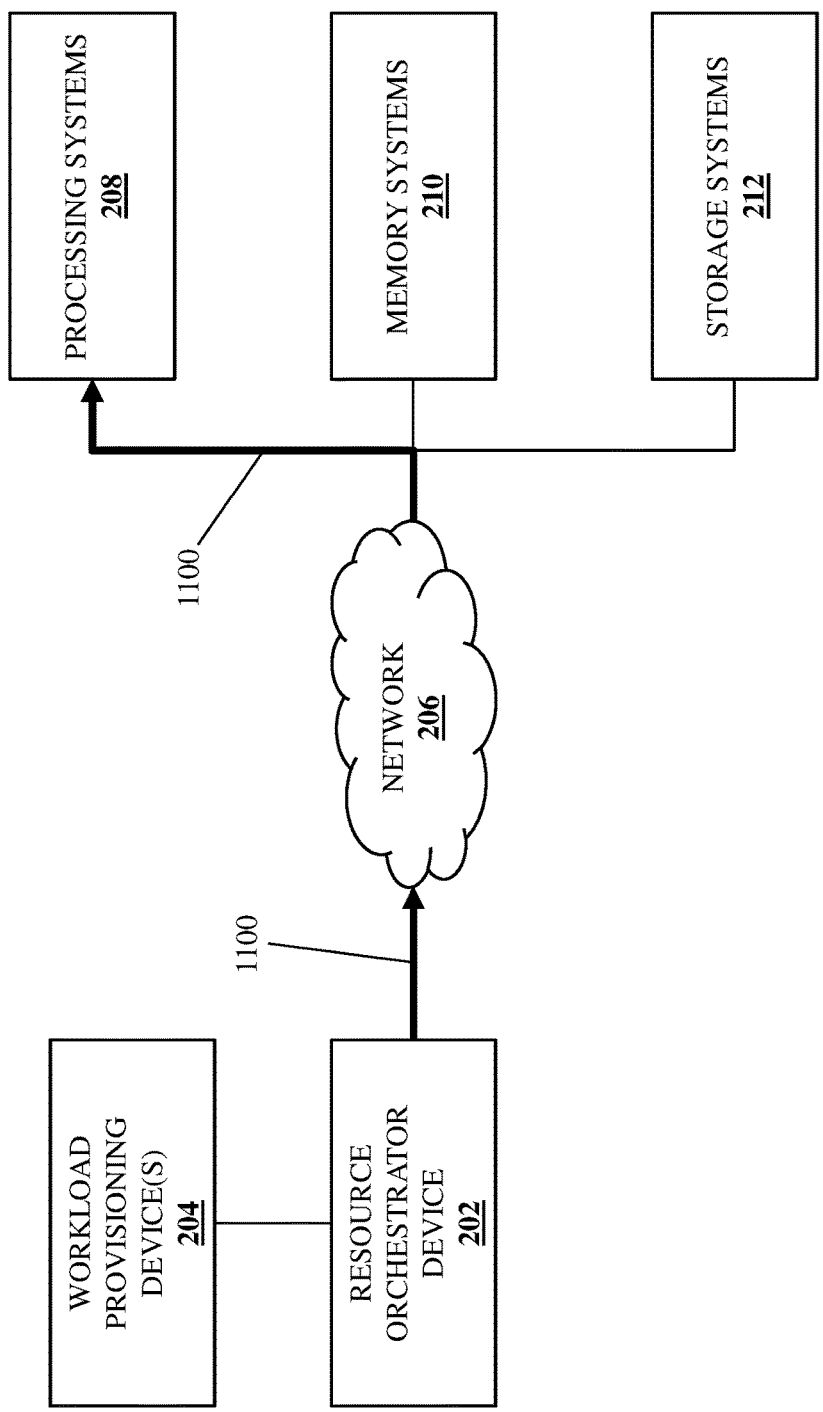
FIG. 11B is a schematic view illustrating an embodiment of the shared memory fabric workload performance system of FIG. 2 operating during the method of FIGS. 4A and 4B.

The method 400 then proceeds to block 410 where the resource orchestrator device transmits a function instruction to a first processing resource determined for a first function. With reference to FIGS. 11A and 11B, in an embodiment of block 410, the resource orchestrator engine 304 in the resource orchestrator device 202/300 may perform function instruction transmission operations 1100 that may include transmitting a function instruction via its communication system 308 and through the network 206 to a first processing system in the processing systems 208 that includes a first processing resource that was determined for performing a first function. However, while the example illustrated and discussed below initiates the performance of the workload requested at block 402 via the transmission of a function instruction to perform the first function for that workload (with the remaining functions for that workload then performed in sequence and based on the completion of the previous function), one of skill in the art in possession of the present disclosure will recognize that the performance of the functions for the workload may be initiated in other manners that will fall within the scope of the present disclosure as well. Furthermore, while the workload is illustrated and described below as being initiated via the performance of a single function, the initiation of a workload via the performance of multiple functions initiated by multiple function instructions will fall within the scope of the present disclosure as well.

Figure 12A:
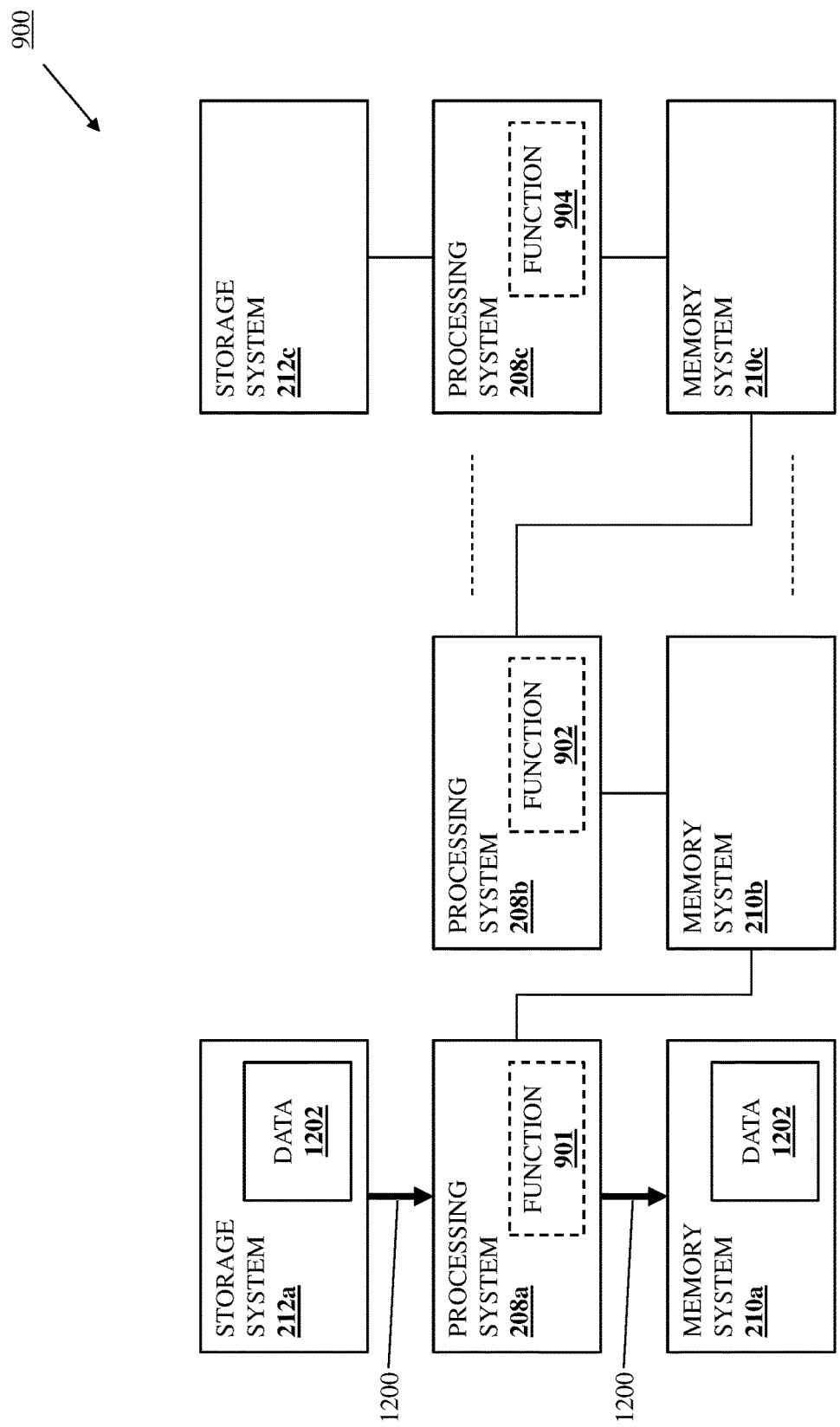
FIG. 12A is a schematic view illustrating an embodiment of the operation of the resource pipeline of FIG. 9 during the method of FIGS. 4A and 4B.
Figure 12B:
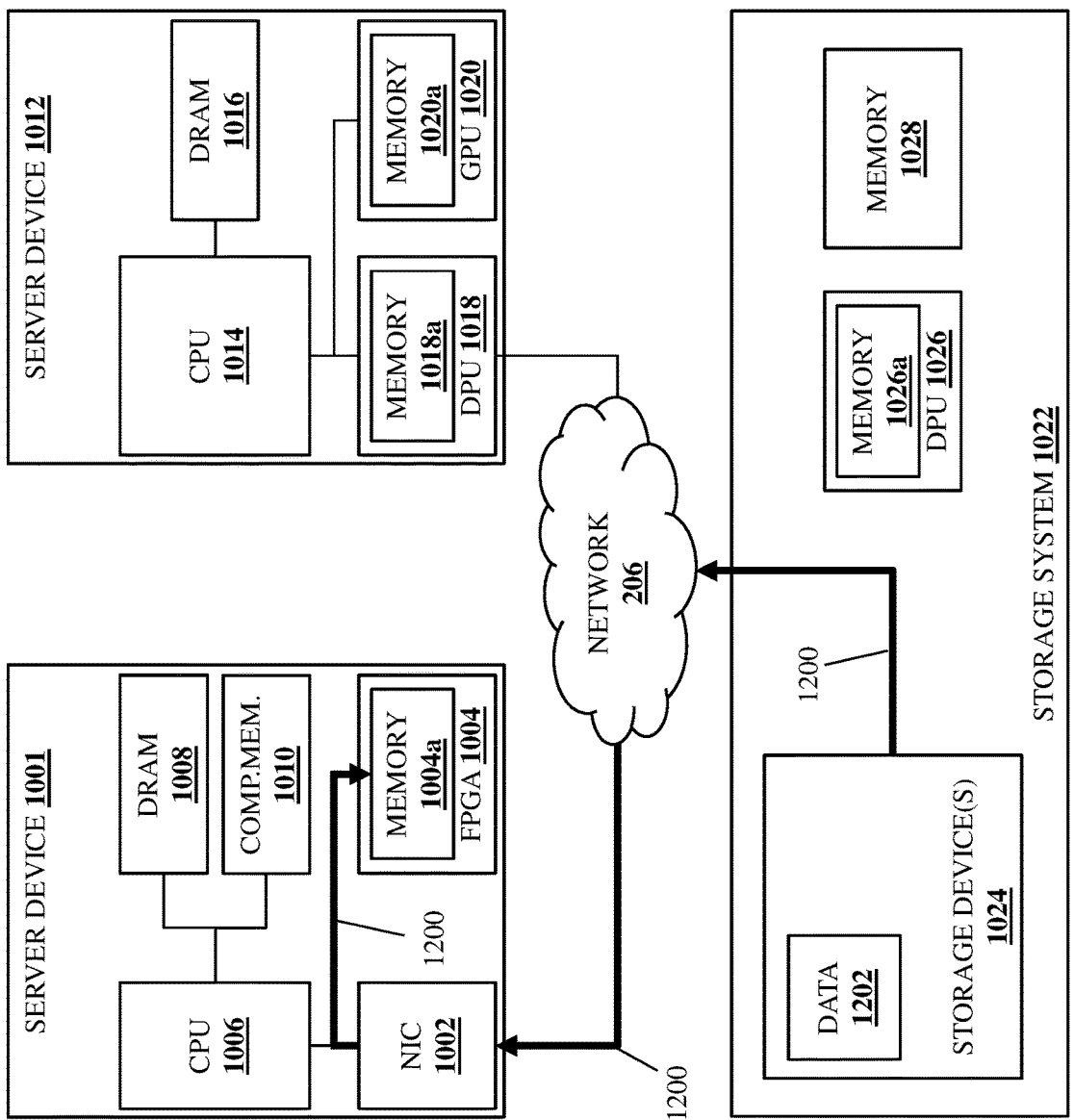
FIG. 12B is a schematic view illustrating an embodiment of the operation of the networked system of FIG. 10 during the method of FIGS. 4A and 4B.

The method 400 then proceeds to block 412 where the first processing resource retrieves first data from a storage device and stores the first data in a first memory resource determined for the first function. With reference to FIG. 12A, in an embodiment of block 412, the processing resource provided by the processing system 208a may perform data retrieval operations 1200 that include retrieving data 1202 stored in the storage resource provided by the storage system 212a and storing that data 1202 in the memory resource provided by the memory system 210a. With reference to the networked system 1000 illustrated in FIG. 12B, the data retrieval operations 1200 may include the FPGA 1004 (e.g., the processing resource in the processing system 208a discussed above) using a storage API to read the data 1202 from the storage device(s) 1024 (e.g., the storage resource in the storage system 212a discussed above) via the NIC 1002 and the network 206, and then writing the data to its memory system 1004a (e.g., the memory resource in the memory system 210a discussed above).

Figure 13A:
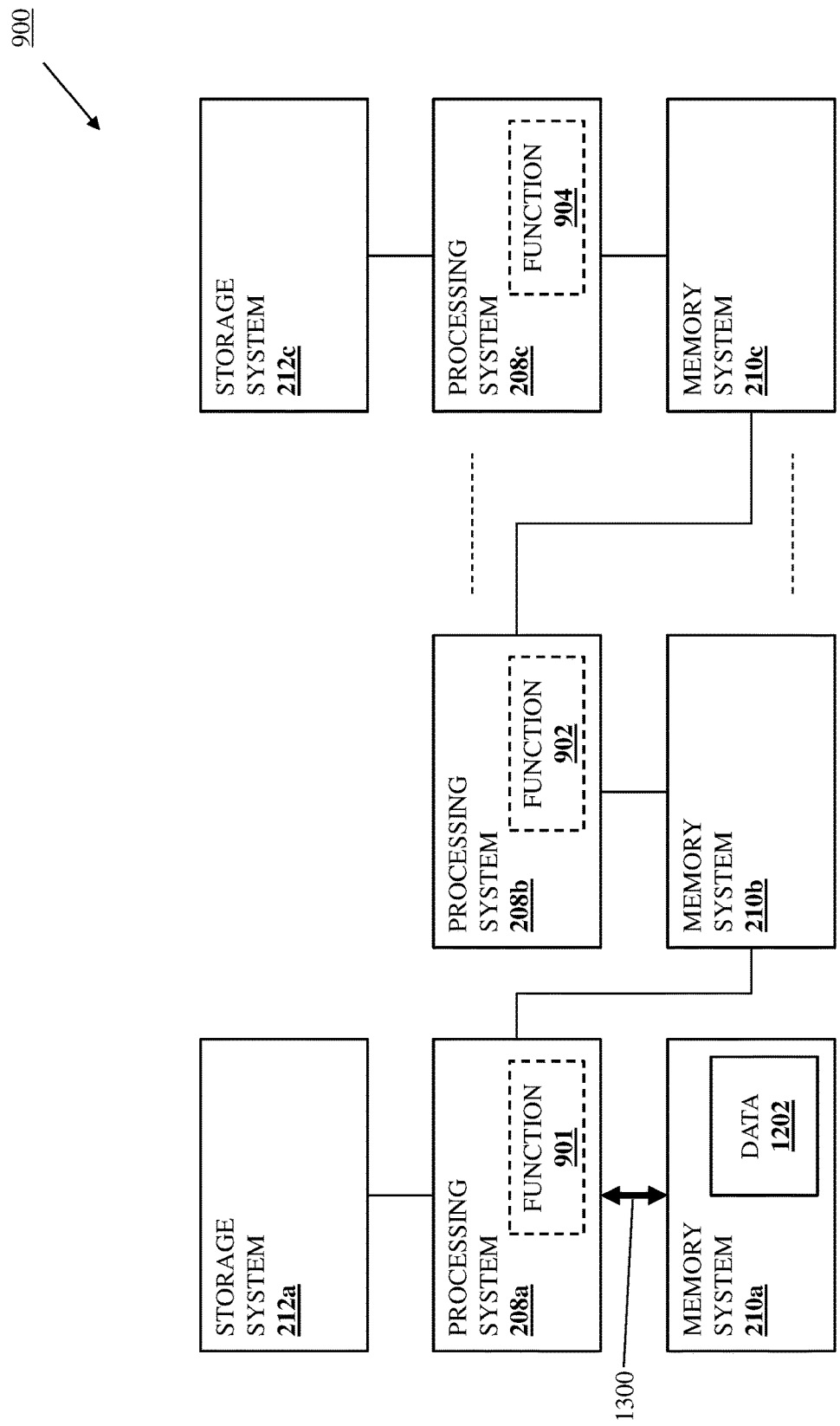
FIG. 13A is a schematic view illustrating an embodiment of the operation of the resource pipeline of FIG. 9 during the method of FIGS. 4A and 4B.

The method 400 then proceeds to block 414 where the first processing resource performs the first function on the first data in the first memory resource. With reference to FIG. 13A, in an embodiment of block 414, the processing resource provided by the processing system 208a may perform function performance operations 1300 that include performing the function 901 on the data 1202 stored in the memory resource provided by the memory system 210a. With reference back to the networked system 1000, the function performance operations 1300 may include the FPGA 1004 (e.g., the processing resource in the processing system 208a discussed above) performing the function 901 (e.g., a generation data transformation) on the data stored in its memory system 1004a (e.g., the memory resource in the memory system 210a discussed above) to generated "first intermediate" data.

The method 400 then proceeds to decision block 416 where the method 400 proceeds depending on whether there are more functions to perform. At decision block 416, the method 400 will proceed depending on whether there are more functions to perform in order to complete the performance of the workload requested at block 402, with each processing resource (other than the processing resource that performs the last function for the workload) storing the intermediate data generated via the performance of its function in a memory system used by another of the processing resources. As will be appreciated by one of skill in the art in possession of the present disclosure, in the discussion below, the first processing resource discussed above becomes the "current" processing resource that generated "intermediate" data via performance of the first function/ "current" function on the first data.

Figure 13B:
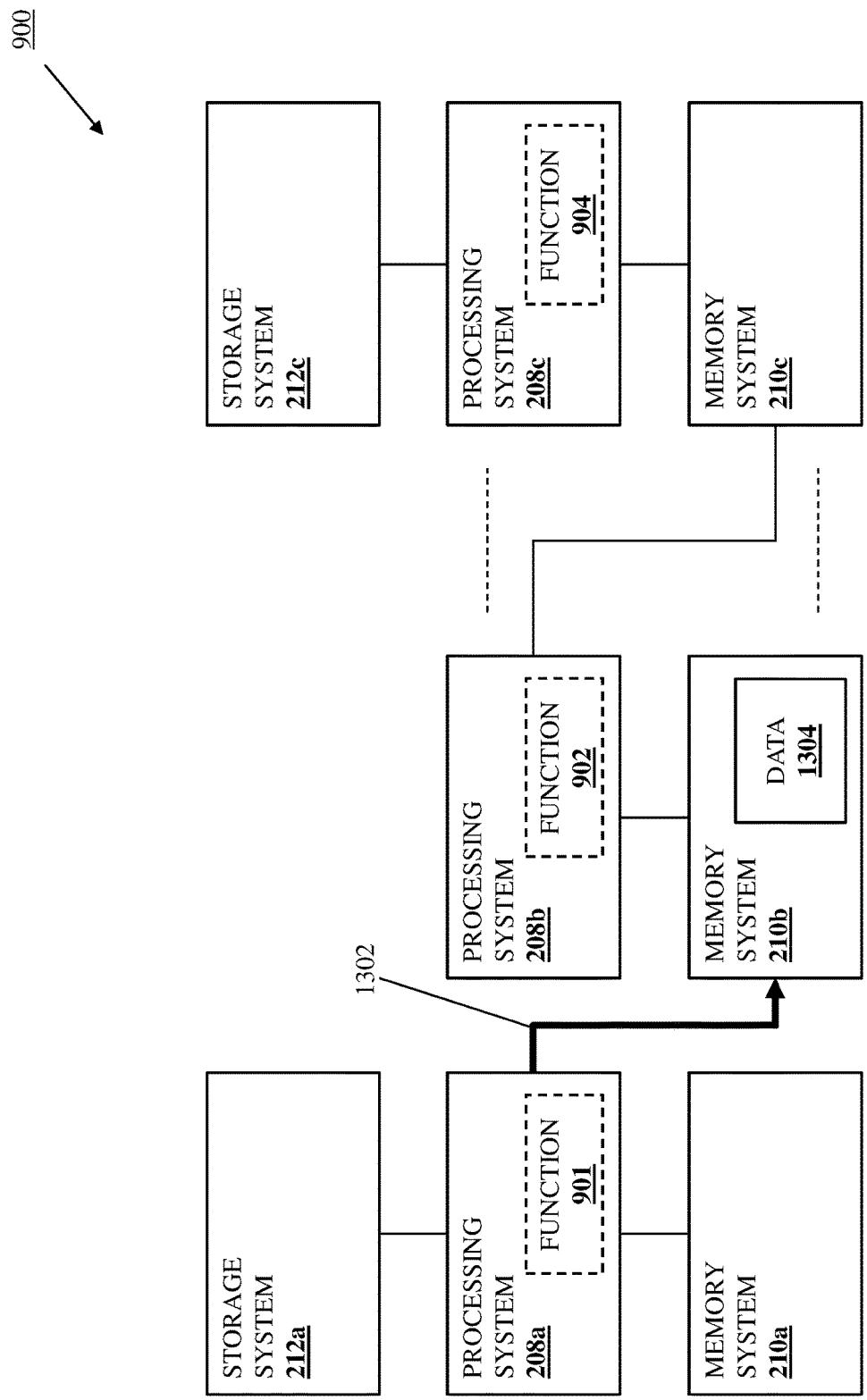
FIG. 13B is a schematic view illustrating an embodiment of the operation of the resource pipeline of FIG. 9 during the method of FIGS. 4A and 4B.
Figure 13C:
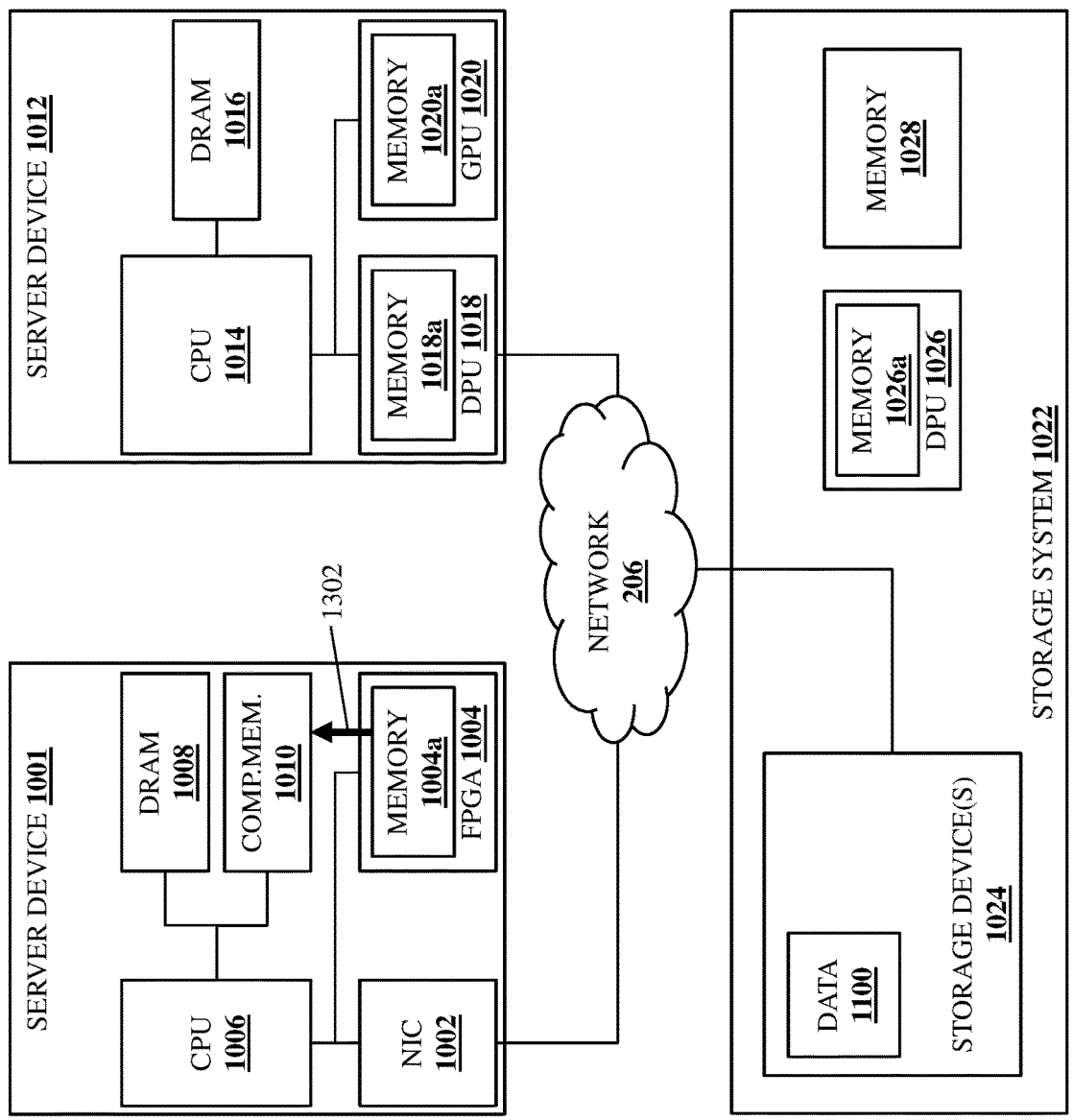
FIG. 13C is a schematic view illustrating an embodiment of the operation of the networked system of FIG. 10 during the method of FIGS. 4A and 4B.

If, at decision block 416, there are more functions to perform, the method 400 proceeds to block 418 where the current processing resource stores intermediate data in a subsequent memory resource determined for a subsequent function. With reference to FIG. 13B, in an embodiment of block 418, the processing resource provided by the processing system 208a may perform intermediate data storage operations 1302 that include storing intermediate data 1304 generated via its performance of the function 901 on the data 1202 in the memory resource provided by the memory system 210b. With reference to the networked system 1000 illustrated in FIG. 13C, the data storage operations 1302 may include the FPGA 1004 (e.g., the processing resource in the processing system 208a discussed above) performing an RDMA operation to write the "first intermediate" data to the computational memory system 1010 (e.g., the memory resource in the memory system 210b discussed above).

However, while the examples provided herein describe a "current" processing resource performing RDMA operations to write data to a memory resource that is directly connected to a "subsequent" processing resource, one of skill in the art in possession of the present disclosure will appreciate how the "current" processing resource may write data to its directly-connected memory resource and that data may then be read via RDMA operations by a "subsequent" processing resource, or how the "current" processing resource may perform RDMA operations to write data to a memory resource and that data may then be read via RDMA operations by a "subsequent" processing resource, while remaining within the scope of the present disclosure as well.

The method 400 then proceeds to block 420 where a subsequent processing resource determined for the subsequent function performs the subsequent function on the intermediate data stored in the subsequent memory resource. In some embodiments, the "subsequent" processing resource may monitor the "subsequent" memory resource for the intermediate data such that, in response to that intermediate data being stored in the "subsequent" memory resource by the "current" processing resource, the "subsequent" processing resource performs its "subsequent" function. However, other techniques for initiating the performance of the "subsequent" functions described herein will fall within the scope of the present disclosure as well. With reference to FIG. 14A, in an embodiment of block 420, the processing resource provided by the processing system 208b may perform function performance operations 1400 that include performing the function 902 (e.g., a mathematical computation) on the data 1304 stored in the memory resource provided by the memory system 210b. With reference back to the networked system 1000, the function performance operations 1400 may include the computational memory system 1010 (e.g., the processing resource in the processing system 208b discussed above) performing the function 902 on the "first intermediate" data stored on the computational memory system 1010 (e.g., which also provides the memory resource in the memory system 210b discussed above) to generate "second intermediate" data.

The method 400 then returns to block 416. As will be appreciated by one of skill in the art in possession of the present disclosure, in subsequent iterations of blocks 418 and 420 of the method 400, the "subsequent" processing resource of the previous iteration of block 420 becomes the "current" processing resource of the current iteration of block 418 that generated new "intermediate" data via performance of the "subsequent" function on the "old" intermediate data at the previously iteration of block 420. As such, the method 400 may loop such as, as long as there are more functions to perform, the "current" function will be performed on data generated by the "previous" function, with the data generated by the "current" function stored in the memory resource that will be used by the "subsequent" function, and thus the intermediate data is transformed via the functions required to perform the workload requested at block 402.

Figure 15A:
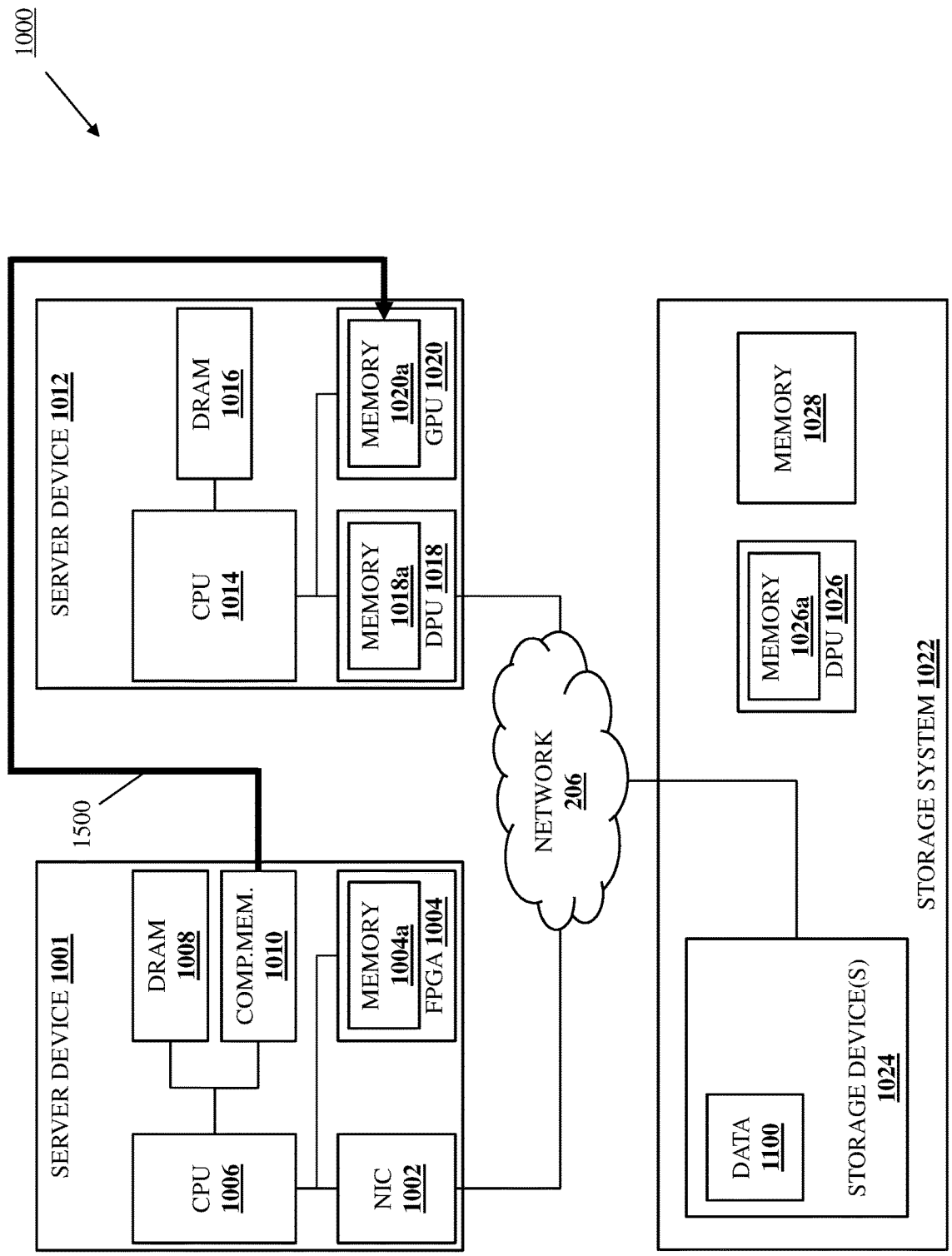
FIG. 15A is a schematic view illustrating an embodiment of the operation of the networked system of FIG. 10 during the method of FIGS. 4A and 4B.
Figure 15B:
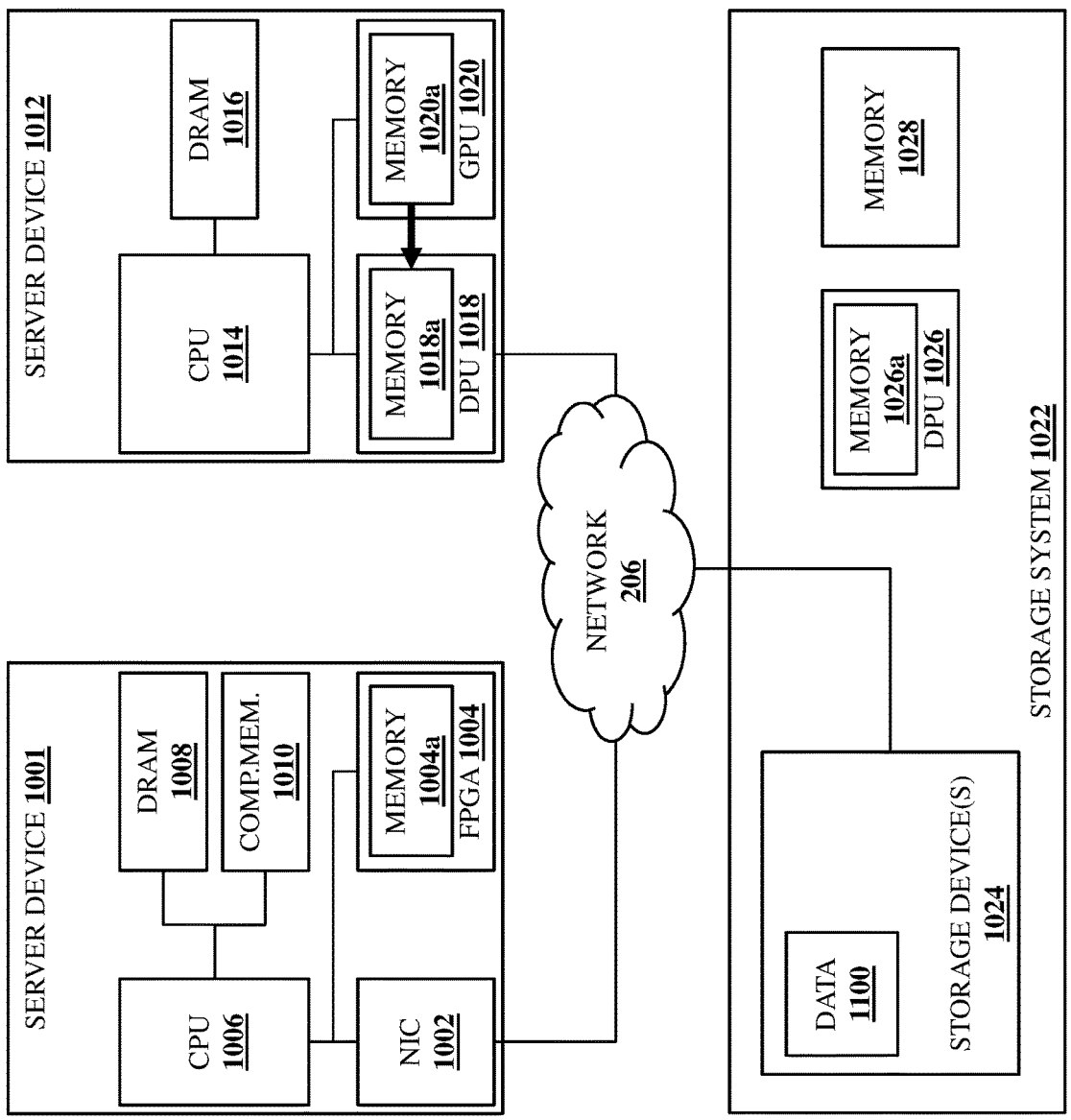
FIG. 15B is a schematic view illustrating an embodiment of the operation of the networked system of FIG. 10 during the method of FIGS. 4A and 4B.

With reference to FIG. 14B, in an embodiment, the subsequent iterations of blocks 418 and 420 may result in intermediate data transformation operations 1402 that further transform the intermediate data generated by the processing resource provided by the processing system 208b to provide intermediate data 1404 that is stored in the memory resource provided by the memory system 210c. For example, with reference to the networked system 1000 illustrated in FIG. 15A, the intermediate data transformation operations 1402 may include the computational memory system 1010 performing an RDMA operation to write the "second intermediate" data generated by the computational memory system 1010 to the memory system 1020a in the GPU 1020, and the GPU 1020 performing a function (e.g., Artificial Intelligence inferencing or training) on the "second intermediate" data stored on the memory system 1020a to generate "third intermediate" data. With reference to the networked system 1000 illustrated in FIG. 15B, the data transformation operations 1402 may also include the GPU 1020 performing an RDMA operation to write the "third intermediate" data generated by the GPU 1020 to the memory system 1018a in the DPU 1018.

Figure 16A:
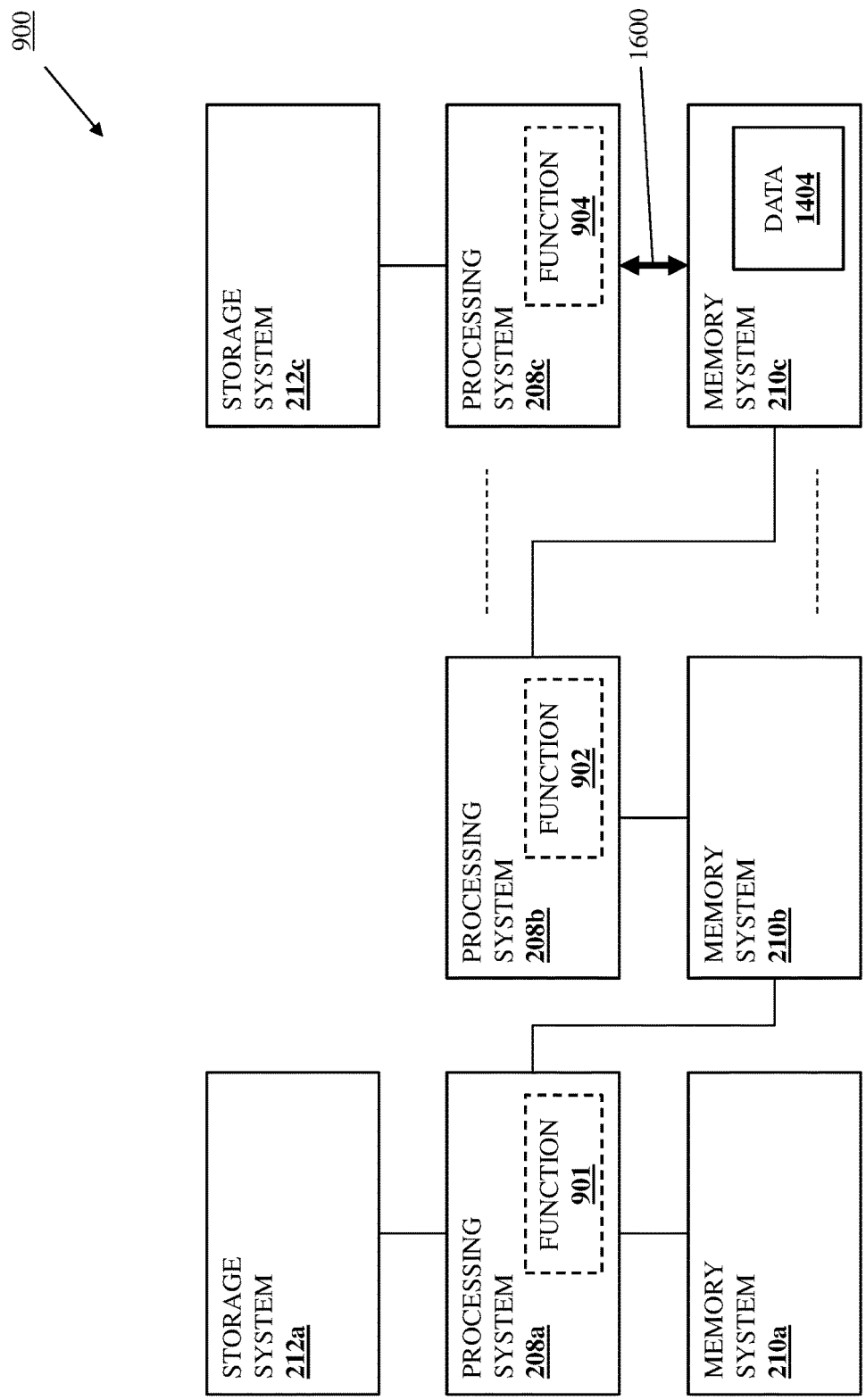
FIG. 16A is a schematic view illustrating an embodiment of the operation of the resource pipeline of FIG. 9 during the method of FIGS. 4A and 4B.

If at decision block 416, there are no more functions to perform, the method 400 proceeds to block 422 where the current processing resource stores final data in a storage device. With reference to FIG. 16A, in an embodiment of the final iteration of block 418 prior to determining there are no more functions to perform, the processing resource provided by the processing system 208c may perform function performance operations 1600 that include performing the function 904 on the data 1404 stored in the memory resource provided by the memory system 210c. With reference back to the networked system 1000, the function performance operations 1600 may include the DPU 1018 (e.g., the processing resource in the processing system 208c discussed above) performing the function 904 (e.g., encryption) on the "third intermediate" data stored on the memory system 1018a (e.g., the memory resource in the memory system 210c discussed above) to generate "fourth intermediate" data.

Figure 16B:
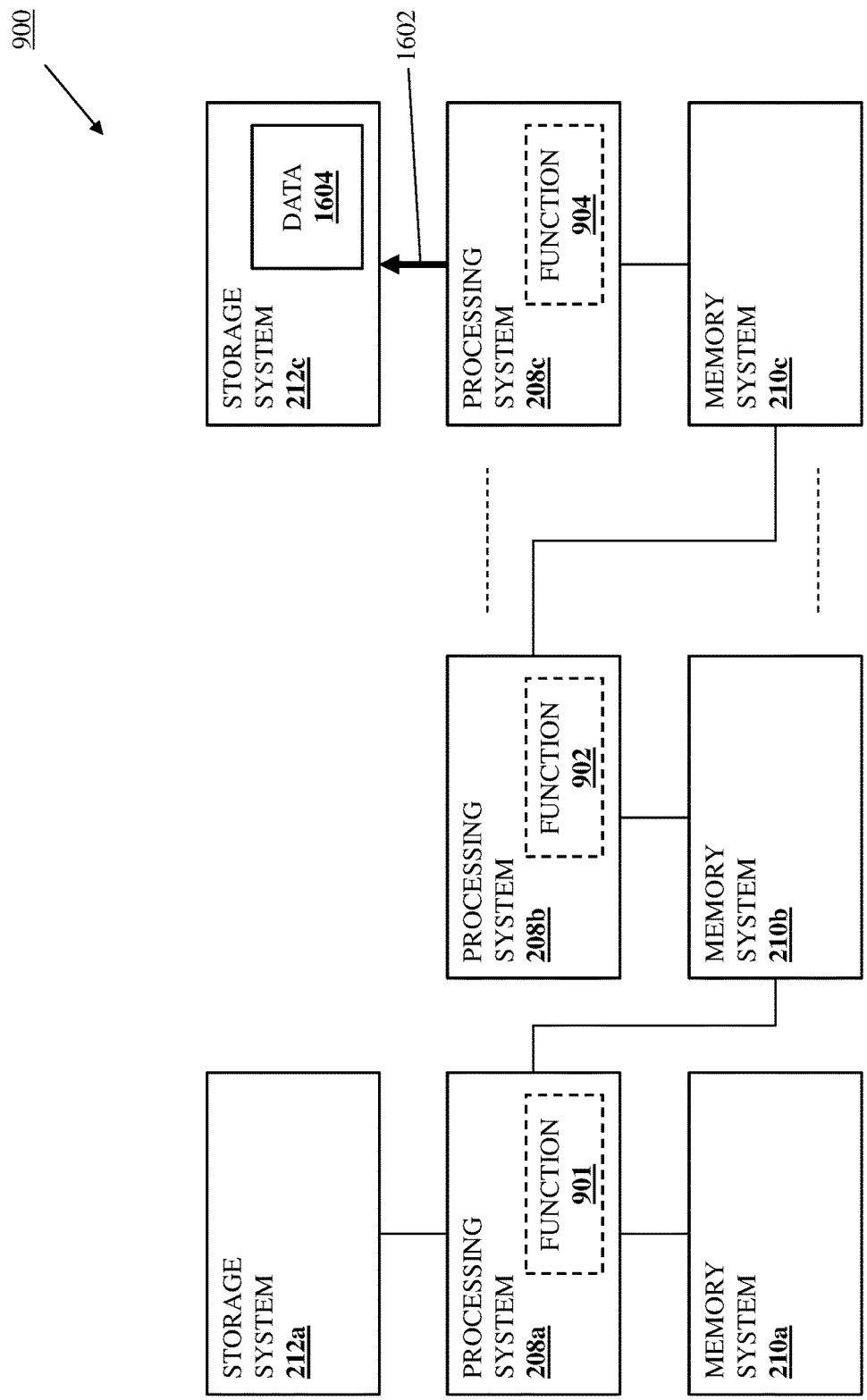
FIG. 16B is a schematic view illustrating an embodiment of the operation of the resource pipeline of FIG. 9 during the method of FIGS. 4A and 4B.
Figure 16C:
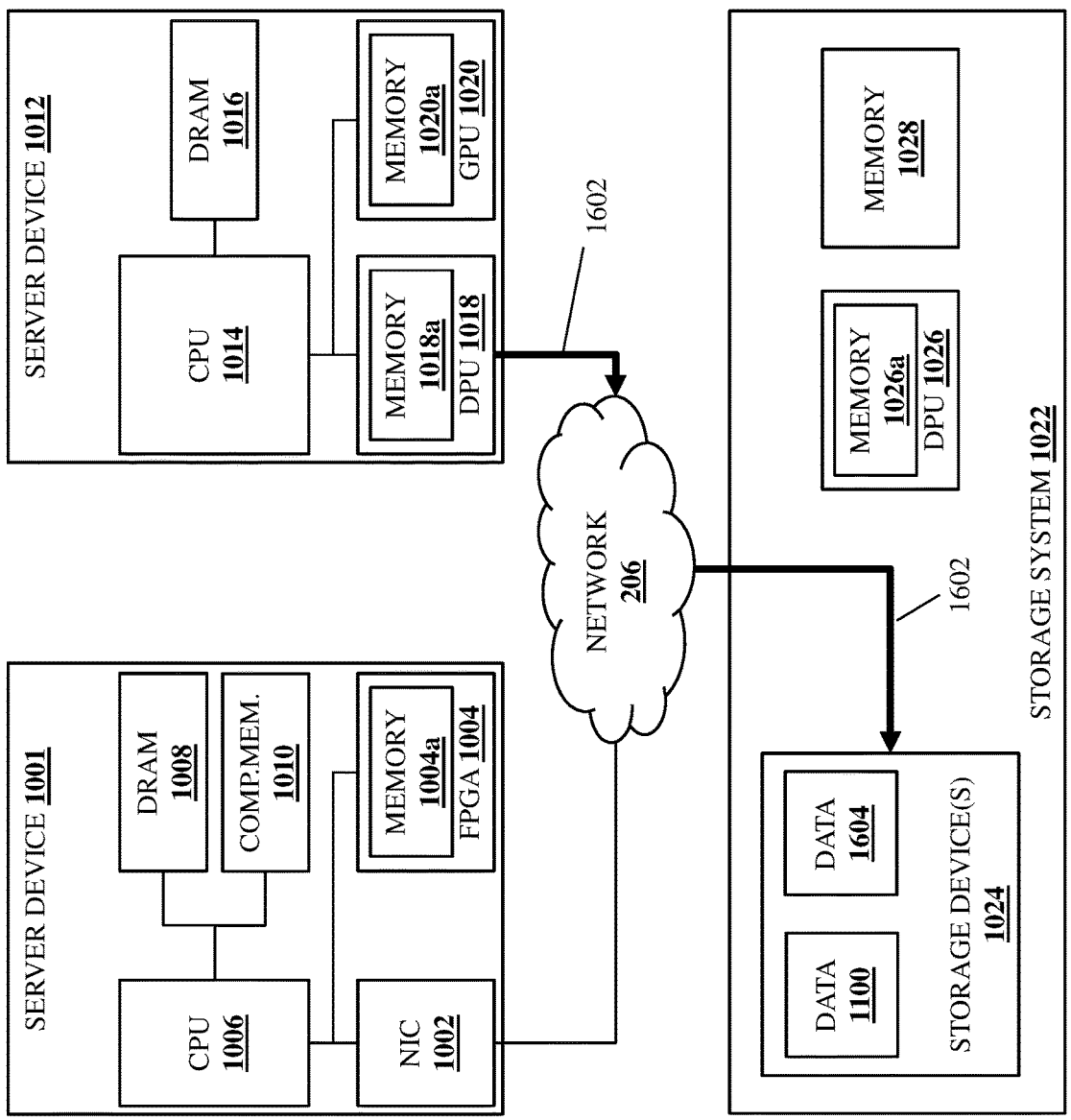
FIG. 16C is a schematic view illustrating an embodiment of the operation of the networked system of FIG. 10 during the method of FIGS. 4A and 4B.

With reference to FIG. 16B, in an embodiment of block 422, the processing resource provided by the processing system 208c may perform data storage operations 1602 that include storing data 1604 generated via the performance of the function 904 on the data 1404 in the storage resource provided by the storage system 212c. With reference to the networked system 1000 illustrated in FIG. 16C, the data storage operations 1200 may include the DPU 1018 (e.g., the processing resource in the processing system 208c discussed above) using a storage API to write the data 1604 to the storage device(s) 1024 (e.g., the storage resource in the storage system 212c discussed above) via the network 206. As will be appreciated by one of skill in the art in possession of the present disclosure, upon the storage of the data 1604 in the storage system 212c, the resource orchestrator engine 304 in the resource orchestrator device 202/300 may provide a workload completion communication to the workload provisioning device(s) 204 that requested the performance of that workload.

Thus, systems and methods have been described that identify a plurality of processing resources that are each configured to perform a function that provides a workload operation required to perform a workload, while configuring any "current" processing resource to output intermediate data generated via its performance of a "current" function to a "subsequent" memory resource used by a "subsequent" processing resource to perform a "subsequent" function. As such, the shared memory fabric workload performance system of the present disclosure provides for the more efficient use of the processing resources, memory resources, storage resources, and/or networking resources in the shared memory fabric workload performance system at least in part by defining each workload as a group of functions in a DAG that is then mapped to a distributed tiered processing/memory fabric based on knowledge of the processing/memory resource relationships, with the DAG also used to configure processing resources to output intermediate data to memory resources used by other processing resources to eliminate inefficient data transfers performed in conventional workload performance systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A shared memory fabric workload performance system, comprising:
a plurality of processing systems;
a plurality of memory systems that are configured to provide a shared memory fabric to each of the plurality of processing systems; and
a resource orchestrator device that is coupled to the plurality of processing systems and the plurality of memory systems, wherein the resource orchestrator device is configured to:
receive a request to perform a workload;
identify a plurality of functions for performing the workload;
generate a Directed Acyclic Graph (DAG) for performing the plurality of functions that identifies a respective processing resource type and a respective memory requirement for performing each of the plurality of functions;
determine, for each of the plurality of functions, a respective processing resource that is provided by the plurality of processing systems and that includes the processing resource type identified in the DAG for performing that function, and a respective memory resource that is provided by the plurality of memory systems and that includes the memory requirement identified in the DAG for performing that function;
map, for each of the plurality of functions and based on the memory requirement identified in the DAG for performing that function, the respective memory resource determined for that function to the respective processing resource determined for that function; and
transmit, to a first processing resource that was determined for a first function in the plurality of functions based on the DAG, a first function instruction that is configured to cause the first processing resource to perform the first function on first data in a first memory resource that was determined for the first function based on the DAG to generate second data, and store that second data in a second memory resource, which was determined for a second function in the plurality of functions based on the DAG, without storing that second data in a storage device.

2. The system of claim 1, further comprising:
a storage device that is coupled to the resource orchestrator device, wherein the first function instruction is configured to cause the first processing resource to retrieve the first data from the storage device and store that first data in the first memory resource determined for the first function.

3. The system of claim 1, wherein the storage of the second data in the second memory resource that was determined for the second function based on the DAG is configured to cause a second processing resource that was determined for the second function based on the DAG to perform the second function on the second data in the second memory resource that was determined for the second function based on the DAG to generate third data, and store that third data in a third memory resource, which was determined for a third function in the plurality of functions based on the DAG, without storing that third data in a storage device.

4. The system of claim 1, wherein the storage of the second data in the second memory resource that was determined for the second function based on the DAG includes performing a shared memory fabric Remote Direct Memory Access (RDMA) operation to store the second data in the second memory resource that was determined for the second function based on the DAG.

5. The system of claim 1, wherein the resource orchestrator device is configured to:
determine a directly-connected memory resource that is directly connected to each of the plurality of processing systems, wherein the determining the respective memory resource for each of the plurality of functions includes determining that respective memory resource is the directly-connected memory resource for the respective processing resource that includes the processing resource type identified in the DAG for performing that function.

6. The system of claim 1, wherein the DAG defines, for each intermediate function between a first function and a last function in the plurality of functions, a respective memory resource input for data that utilized by that intermediate function, and a respective memory resource output for data that is generated by that intermediate function that also provides a respective memory resource input for data that is utilized by a subsequent function in the plurality of functions.

7. An Information Handling System (IHS), comprising:
a processing system; and
a memory system that is coupled to the processing system and that includes instructions that, when executed by the processing system, cause the processing system to provide a resource orchestrator engine that is configured to:
receive a request to perform a workload;
identify a plurality of functions for performing the workload;
generate a Directed Acyclic Graph (DAG) for performing the plurality of functions that identifies a respective processing resource type and a respective memory requirement for performing each of the plurality of functions;
determine, for each of the plurality of functions, a respective processing resource that is provided by a plurality of processing systems and that includes the processing resource type identified in the DAG for performing that function, and a respective memory resource that is provided by a plurality of memory systems that are configured to provide a shared memory fabric to each of the plurality of processing systems and that includes the memory requirement identified in the DAG for performing that function;
map, for each of the plurality of functions and based on the memory requirement identified in the DAG for performing that function, the respective memory resource determined for that function to the respective processing resource determined for that function; and
transmit, to a first processing resource that was determined for a first function in the plurality of functions based on the DAG, a first function instruction that is configured to cause the first processing resource to perform the first function on first data in a first memory resource that was determined for the first function based on the DAG to generate second data, and store that second data in a second memory resource, which was determined for a second function in the plurality of functions based on the DAG, without storing that second data in a storage device.

8. The IHS of claim 7, wherein the first function instruction is configured to cause the first processing resource to retrieve the first data from a storage device and store that first data in the first memory resource determined for the first function.

9. The IHS of claim 7, wherein the storage of the second data in the second memory resource that was determined for the second function based on the DAG is configured to cause a second processing resource that was determined for the second function based on the DAG to perform the second function on the second data in the second memory resource that was determined for the second function based on the DAG to generate third data, and store that third data in a third memory resource, which was determined for a third function in the plurality of functions based on the DAG, without storing that third data in a storage device.

10. The IHS of claim 7, wherein the storage of the second data in the second memory resource that was determined for the second function based on the DAG includes performing a shared memory fabric Remote Direct Memory Access (RDMA) operation to store the second data in the second memory resource that was determined for the second function based on the DAG.

11. The IHS of claim 7, wherein the resource orchestrator engine is configured to:
determine a directly-connected memory resource that is directly connected to each of the plurality of processing systems, wherein the determining the respective memory resource for each of the plurality of functions includes determining that respective memory resource is the directly-connected memory resource for the respective processing resource that includes the processing resource type identified in the DAG for performing that function.

12. The IHS of claim 7, wherein the DAG defines, for each intermediate function between a first function and a last function in the plurality of functions, a respective memory resource input for data that utilized by that intermediate function, and a respective memory resource output for data that is generated by that intermediate function that also provides a respective memory resource input for data that is utilized by a subsequent function in the plurality of functions.

13. The IHS of claim 7, wherein the shared memory fabric provided by the plurality of memory systems to each of the plurality of processing systems causes each of the memory resources to be viewed by each of the processing resources as a respective local resource for that processing resource.

14. A method for performing workloads using a shared memory fabric, comprising:
receiving, by a resource orchestrator device, a request to perform a workload;
identifying, by the resource orchestrator device, a plurality of functions for performing the workload;
generating, by the resource orchestrator device, a Directed Acyclic Graph (DAG) for performing the plurality of functions that identifies a respective processing resource type and a respective memory requirement for performing each of the plurality of functions;
determining, by the resource orchestrator device for each of the plurality of functions, a respective processing resource that is provided by a plurality of processing systems and that includes the processing resource type identified in the DAG for performing that function, and a respective memory resource that is provided by a plurality of memory systems that are configured to provide a shared memory fabric to each of the plurality of processing systems and that includes the memory requirement identified in the DAG for performing that function;
mapping, by the resource orchestrator device for each of the plurality of functions and based on the memory requirement identified in the DAG for performing that function, the respective memory resource determined for that function to the respective processing resource determined for that function; and
transmitting, by the resource orchestrator device to a first processing resource that was determined for a first function in the plurality of functions based on the DAG, a first function instruction that causes the first processing resource to perform the first function on first data in a first memory resource that was determined for the first function based on the DAG to generate second data, and store that second data in a second memory resource, which was determined for a second function in the plurality of functions based on the DAG, without storing that second data in a storage device.

15. The method of claim 14, wherein the first function instruction causes the first processing resource to retrieve the first data from a storage device and store that first data in the first memory resource determined for the first function.

16. The method of claim 14, wherein the storage of the second data in the second memory resource that was determined for the second function based on the DAG causes a second processing resource that was determined for the second function based on the DAG to perform the second function on the second data in the second memory resource that was determined for the second function based on the DAG to generate third data, and store that third data in a third memory resource, which was determined for a third function in the plurality of functions based on the DAG, without storing that third data in a storage device.

17. The method of claim 14, wherein the storage of the second data in the second memory resource that was determined for the second function based on the DAG includes performing a shared memory fabric Remote Direct Memory Access (RDMA) operation to store the second data in the second memory resource that was determined for the second function based on the DAG.

18. The method of claim 14, further comprising:
determining, by the resource orchestrator device, a directly-connected memory resource that is directly connected to each of the plurality of processing systems, wherein the determining the respective memory resource for each of the plurality of functions includes determining that respective memory resource is the directly-connected memory resource for the respective processing resource that includes the processing resource type identified in the DAG for performing that function.

19. The method of claim 14, wherein the DAG defines, for each intermediate function between a first function and a last function in the plurality of functions, a respective memory resource input for data that utilized by that intermediate function, and a respective memory resource output for data that is generated by that intermediate function that also provides a respective memory resource input for data that is utilized by a subsequent function in the plurality of functions.

20. The method of claim 14, wherein the shared memory fabric provided by the plurality of memory systems to each of the plurality of processing systems causes each of the memory resources to be viewed by each of the processing resources as a respective local resource for that processing resource.

\* \* \* \* \*